Dec. 8, 1936.  W. NAUMANN  2,063,265
CASH REGISTER AND THE LIKE
Filed Oct. 29, 1931   17 Sheets-Sheet 1

INVENTOR:

Dec. 8, 1936. W. NAUMANN 2,063,265
CASH REGISTER AND THE LIKE
Filed Oct. 29, 1931 17 Sheets-Sheet 4

Dec. 8, 1936.  W. NAUMANN  2,063,265
CASH REGISTER AND THE LIKE
Filed Oct. 29, 1931    17 Sheets-Sheet 6

INVENTOR

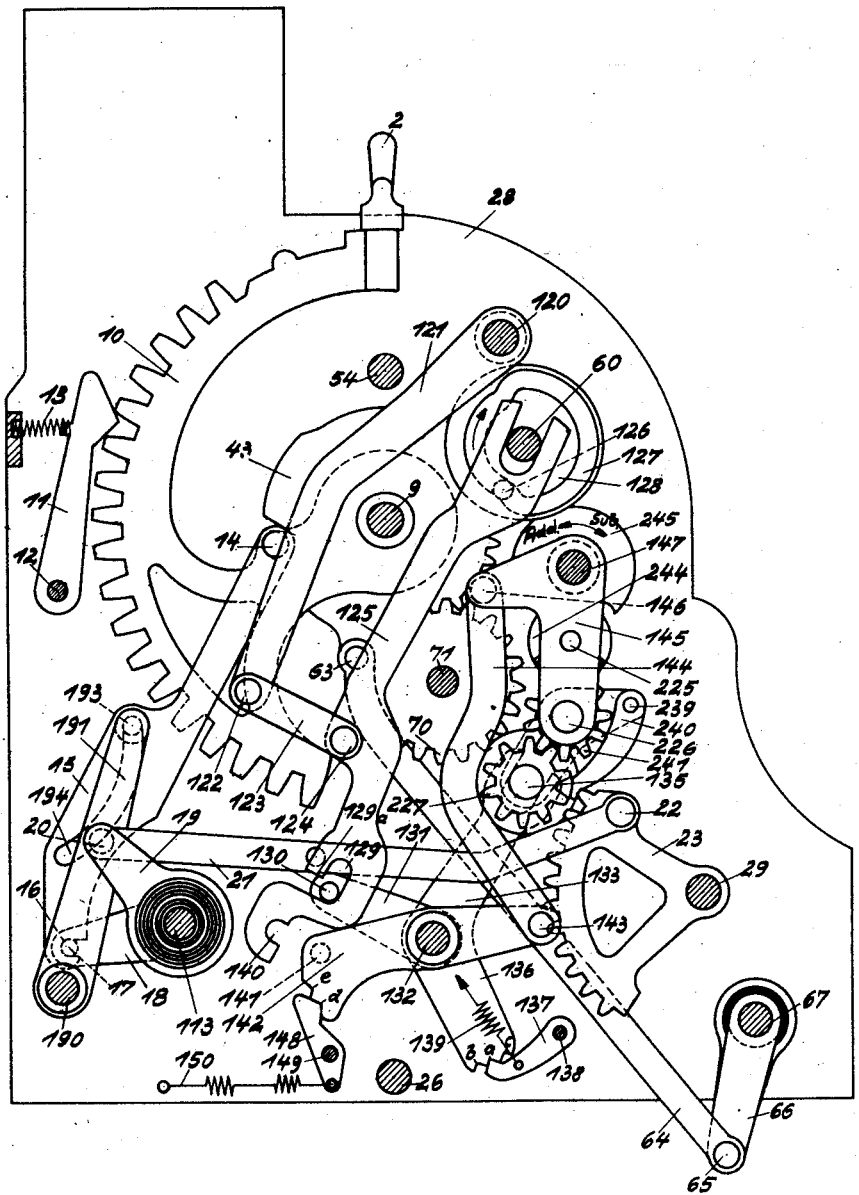

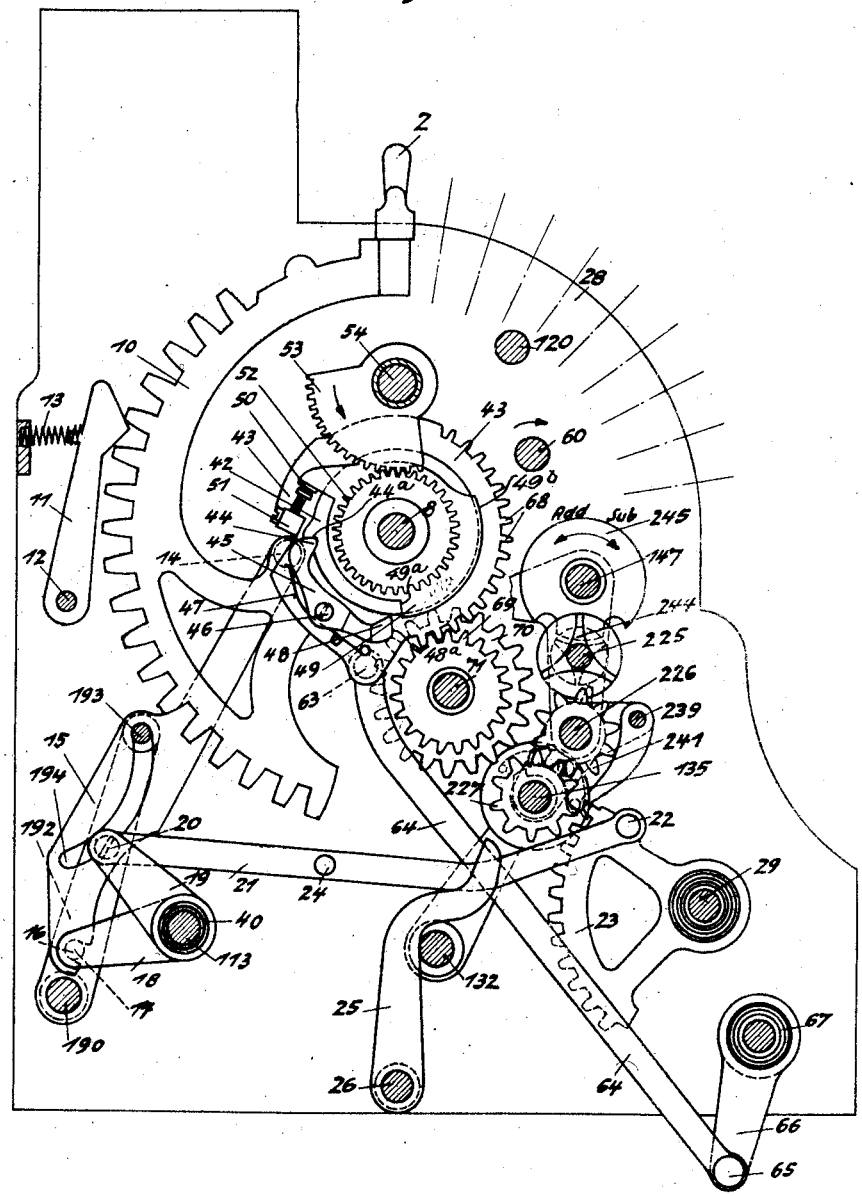

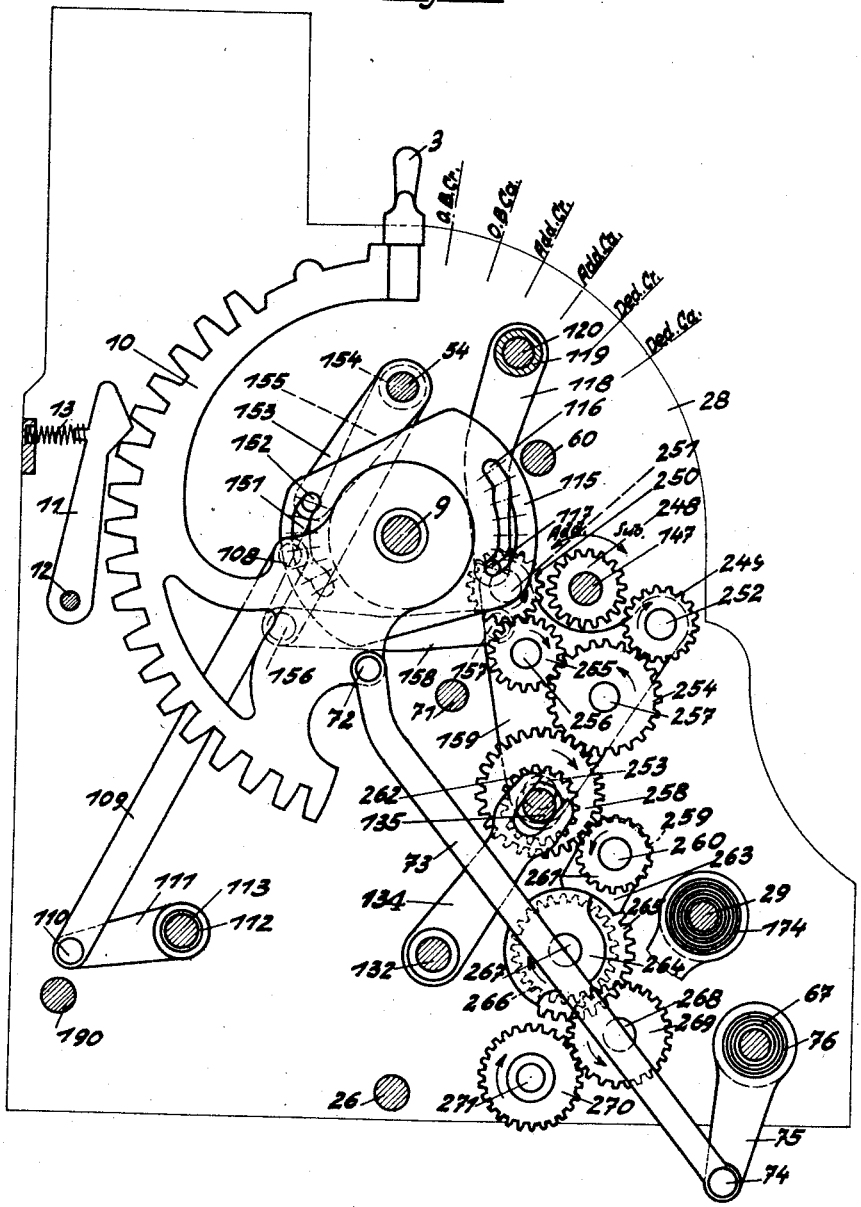

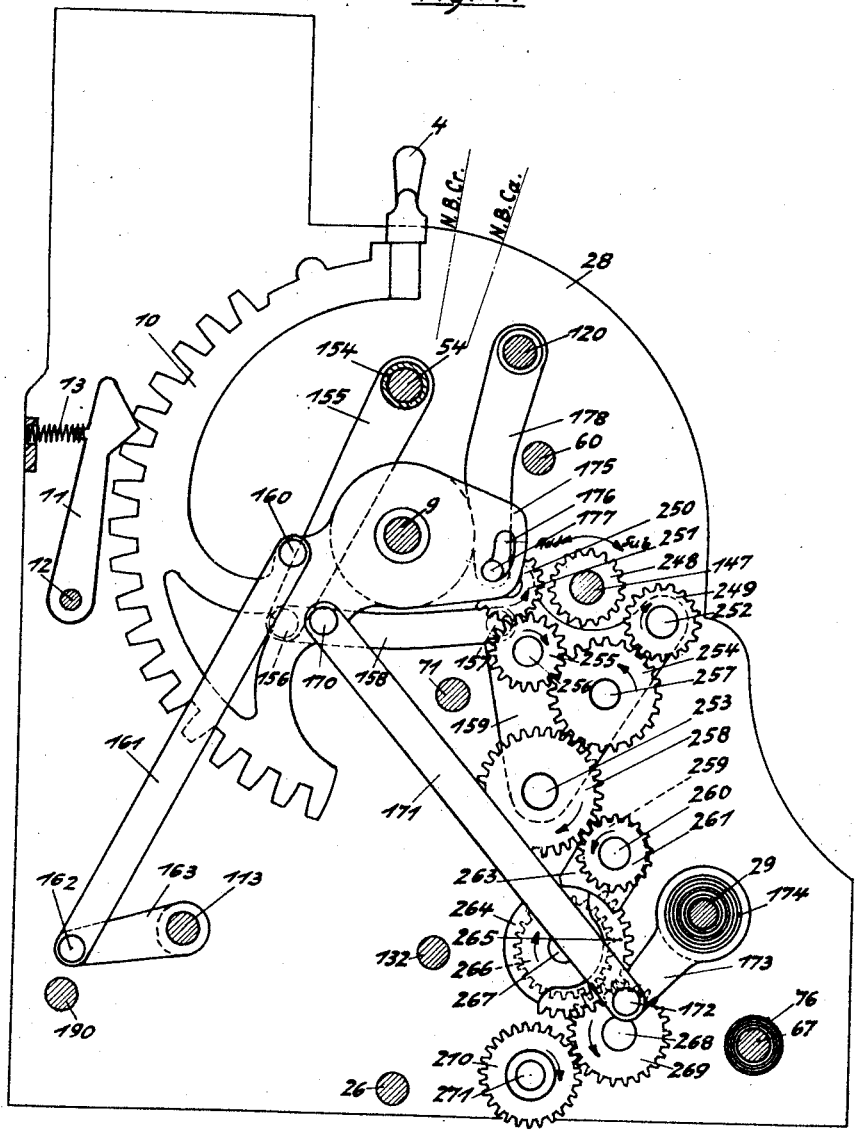

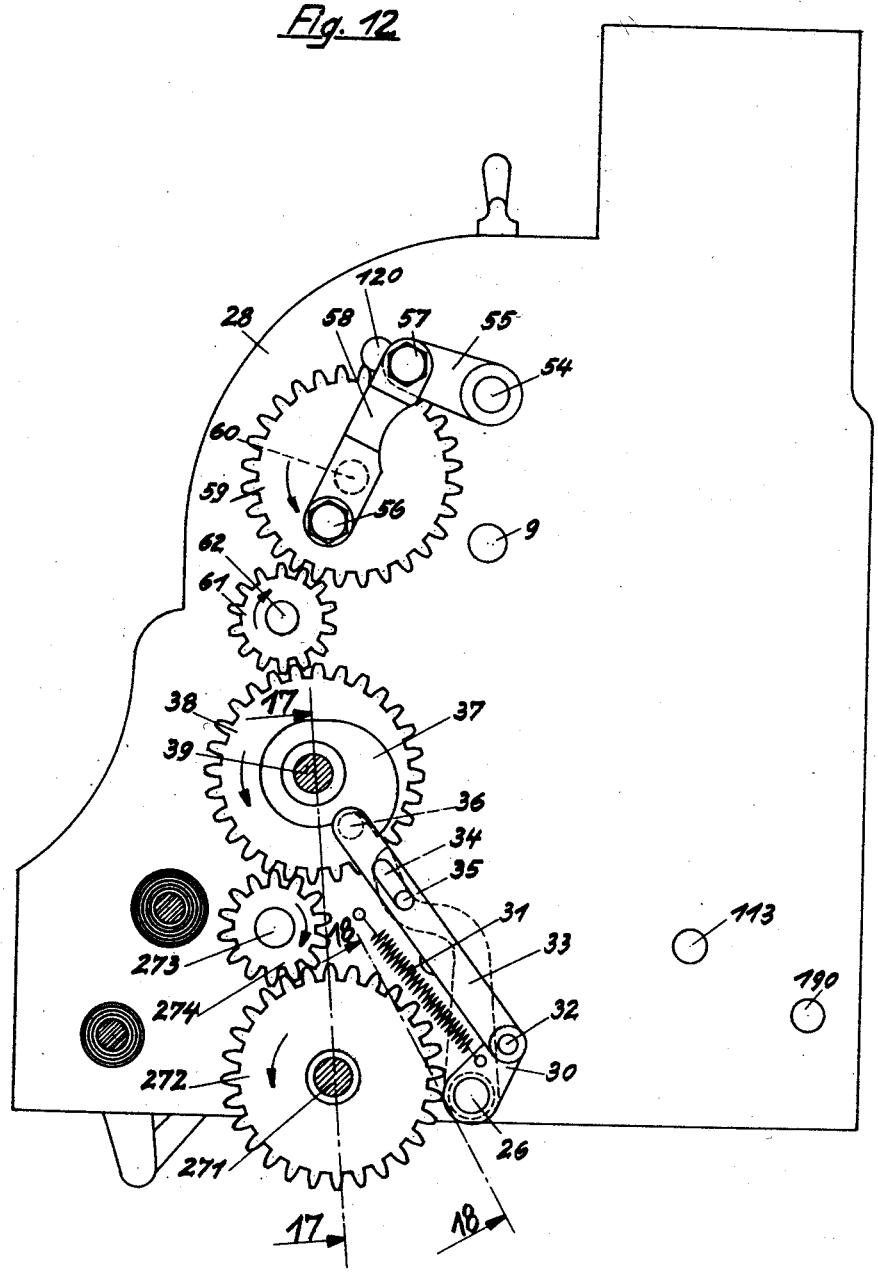

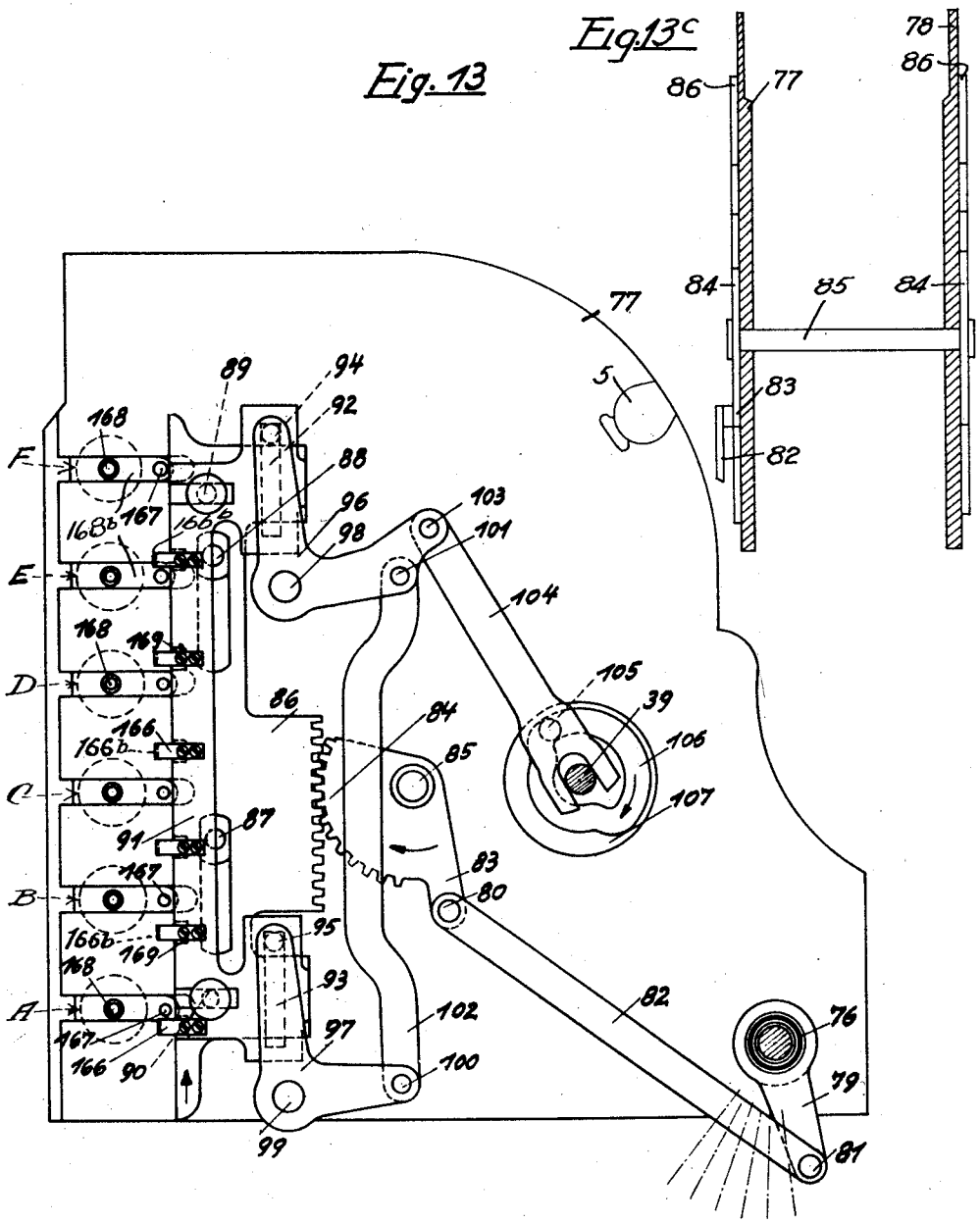

Dec. 8, 1936.   W. NAUMANN   2,063,265
CASH REGISTER AND THE LIKE
Filed Oct. 29, 1931   17 Sheets-Sheet 14

INVENTOR:
Willy Naumann
By: Marks & Clerk
Attys.

Dec. 8, 1936.   W. NAUMANN   2,063,265
CASH REGISTER AND THE LIKE
Filed Oct. 29, 1931   17 Sheets-Sheet 15

Dec. 8, 1936. W. NAUMANN 2,063,265
CASH REGISTER AND THE LIKE
Filed Oct. 29, 1931 17 Sheets-Sheet 16
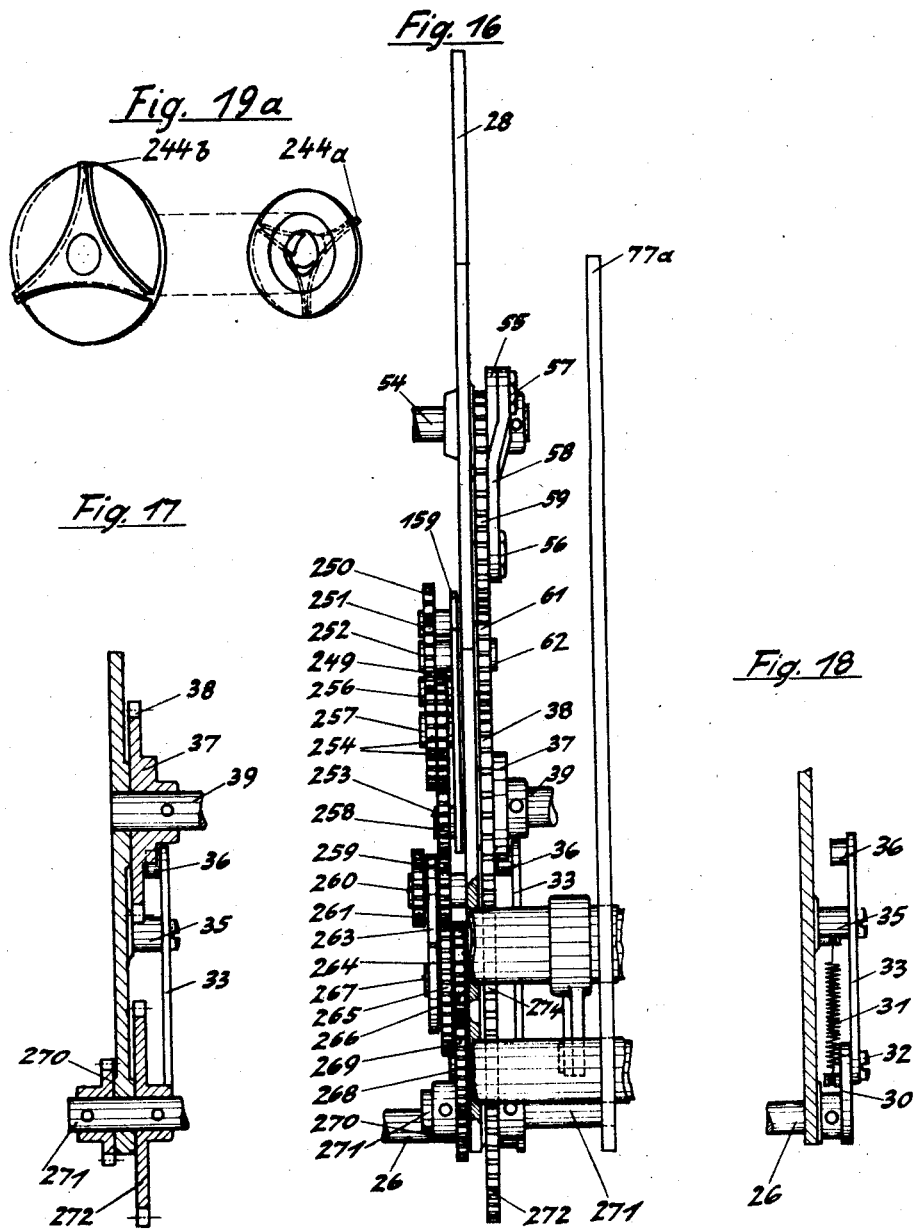

Dec. 8, 1936.  W. NAUMANN  2,063,265
CASH REGISTER AND THE LIKE
Filed Oct. 29, 1931  17 Sheets-Sheet 17
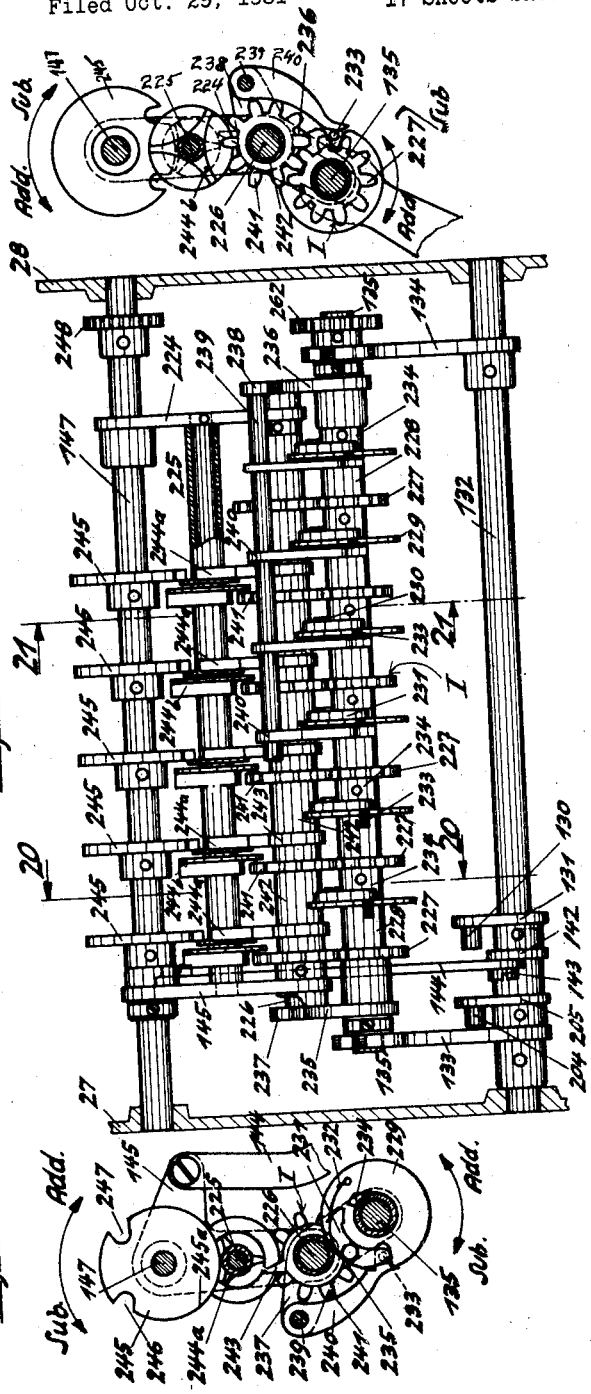
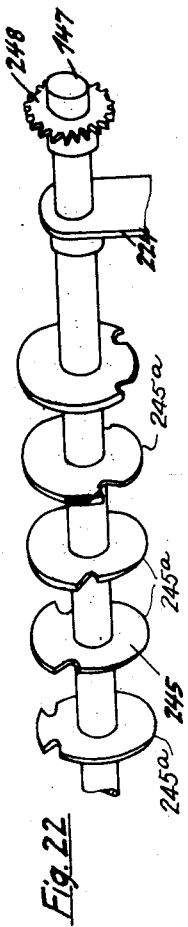
INVENTOR
Willy Naumann
By Marks & Clerk
ATTYS Patented Dec. 8, 1936

2,063,265

UNITED STATES PATENT OFFICE 2,063,265

CASH REGISTER AND THE LIKE

Willy Naumann, Bielefeld, Germany, assignor to Anker-Werke Aktiengesellschaft, Bielefeld, Germany Application October 29, 1931, Serial No. 571,920

6 Claims. (Cl. 235—7)

This invention relates to cash registers and the like which add and subtract any amounts and print the totals thereof.

The principal object of this invention is to provide means to accumulate the totals of the new balances which result from old balances and amounts added thereto or subtracted therefrom, in different totalizers.

Another object of the invention is to provide a new and improved balance mechanism.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

In said drawings:—

Fig. 8 is another side view of the amount setting mechanism on line 8—8 of Fig. 3.

Fig. 9 is a side view of the setting mechanism for the amounts on line 9—9 of Fig. 3.

Fig. 10 is a side view of the setting mechanism for the selection of the totalizers of the first group and the actuating mechanism for the adding and subtracting operations, on line 10—10 of Fig. 3.

Fig. 11 is a side view of the setting mechanism for selecting the new balance totalizers on line 11—11 of Fig. 3.

Fig. 12 is a side view of part of the actuating mechanism, on line 12—12 of Fig. 3.

Fig. 13 is a side view of the selecting mechanism for the totalizers of the first group, on line 13—13, Fig. 3.

Fig. 13c is a simplified front view of the selecting mechanism for the totalizers of the first group, showing parts of the frame in section.

Fig. 16 is a fragmentary front view of the actuating mechanism for the adding mechanism, with parts of the frame in section.

Figs. 17 and 18 show detail sectional views.

Fig. 19 is a fragmentary front view partly in section, of the balance mechanism and parts of its operating mechanism.

Figure 19a is a perspective view of the paired toothed members of the transferring member.

Fig. 20 is a detail sectional view of the transfer mechanism for the balance mechanism, on line 20—20 of Fig. 19.

Fig. 21 is a detail sectional view of the transfer mechanism for the balance mechanism, on line 21—21 of Fig. 19.

Fig. 22 is a perspective front view of a detail of Fig. 19.

The lever board of the machine

Figure 3:
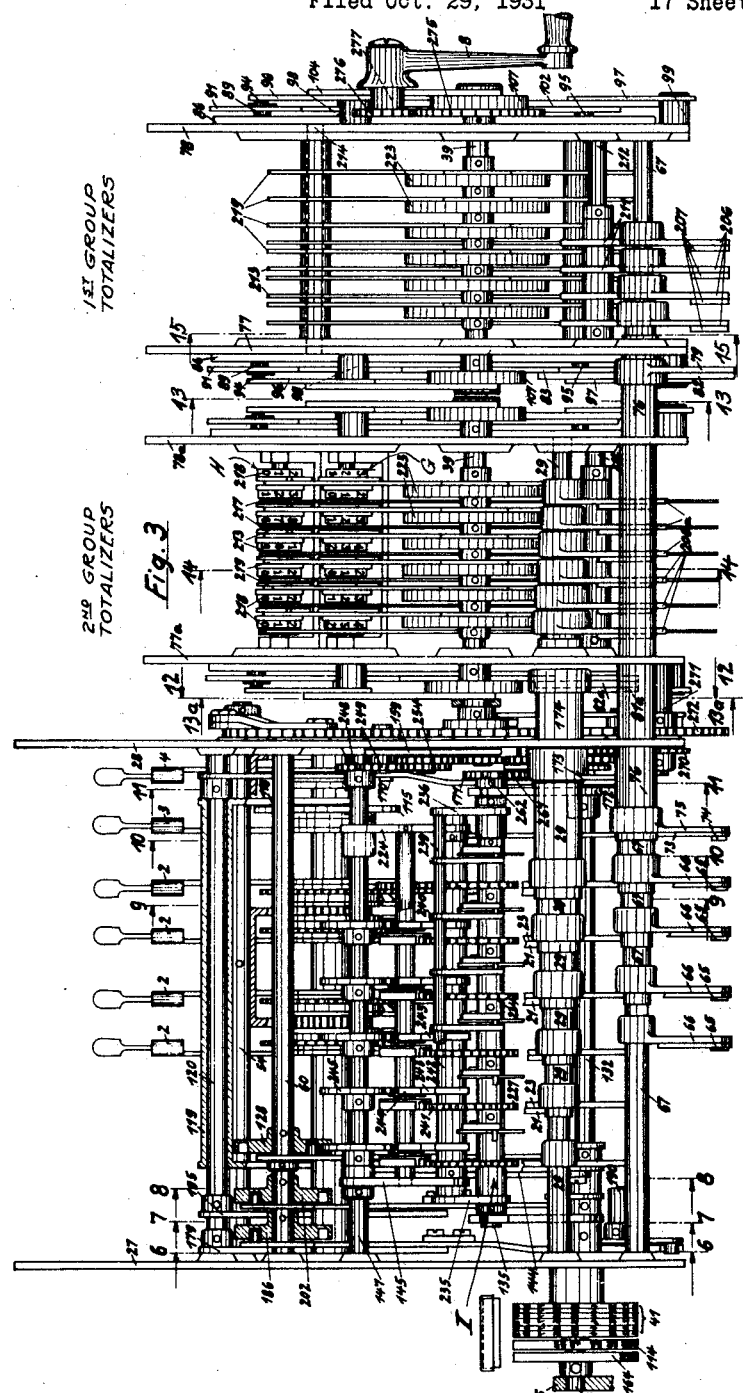
Fig. 3 is a front view of the whole mechanism, omitting the counters and the totalizers of the first group.

Referring first to Fig. 3, the machine is shown to be divided into three principal sections. The section at the right contains the first group of totalizers, which have been omitted from this view for simplification, but which are indicated by the vertical series of dotted circles in Fig. 13 and are shown in side view in Fig. 15. There are six totalizers in this group, namely beginning with the bottom one: A—Old balance credit, B—Old balance capital, C—Add credit, D—Add capital, E—Deduct credit, and F—Deduct capital. In the middle section of the machine are the second group of totalizers, two in number; namely, beginning with the lower one: G—New balance credit and H—New balance capital. In the left section of the machine is the balance mechanism I, which is an add and subtract totalizer having number wheels 227. This section of the machine also contains the setting mechanism.

Figure 1:
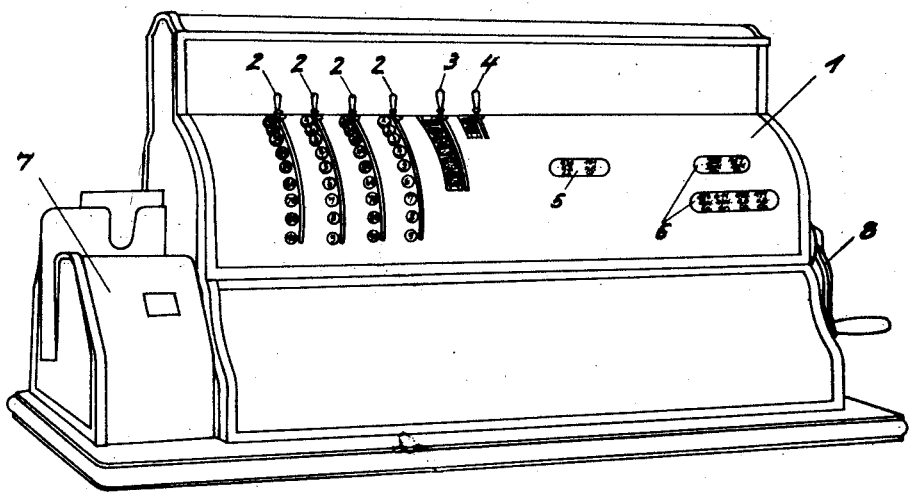
Fig. 1 is a front view of the machine with cabinet.
Figure 2:
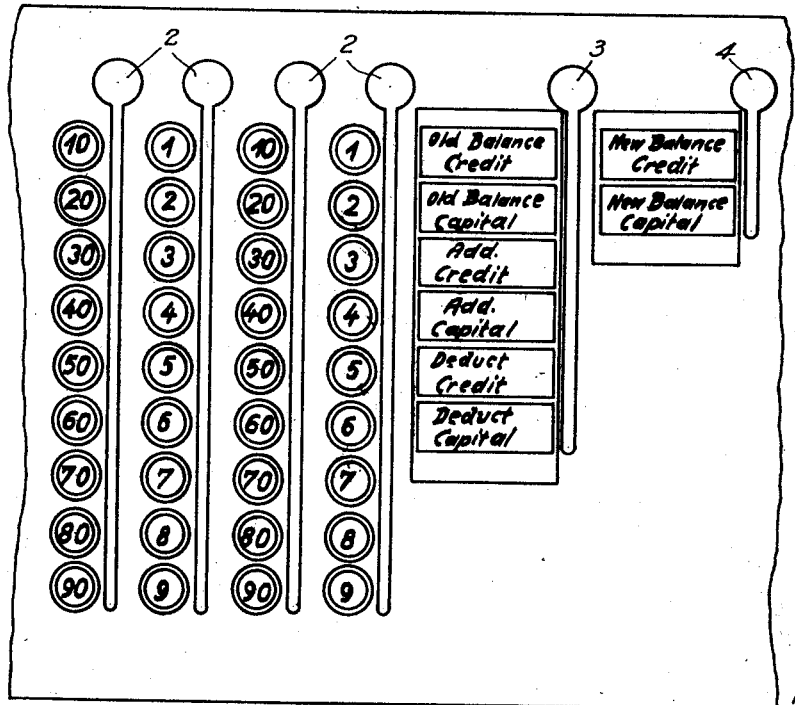
Fig. 2 shows the lever board.

The front cabinet 1 of the machine is fitted with levers 2 for setting the amounts (Fig. 1). On the right hand side of the amount levers, there is a lever 3 for selecting the six totalizers of the first group and a lever 4 for selecting the two totalizers of the second group, which add the new balances. On the right hand side of the lever board, there are arranged two counters 5 for the two totalizers for the new balances and six counters 6 for the totalizers of the first group, which keep a count of the number of operations of the different totalizers, and the indications of which may be read off conveniently through suitable openings on the front of the machine. The counters 5 are designated in Fig. 1 by the abbreviations N. B. Ca. and N. B. Cr., denoting respectively the "New balance capital" totalizer and the "New balance credit" totalizer, with the numerical count of the operations executed by each totalizer above the respective abbreviations. Likewise, the upper counters 6 are designated Ded. Ca. and Ded. Cr. corresponding to the "Deduct capital" and "Deduct credit" totalizers of the first group. The lower counters 6 are designated Add Ca.; Add Cr.; O. B. Ca.; and O. B. Cr. corresponding to "Add capital", "Add credit", "Old balance capital", and "Old balance credit" totalizers of the first group. The counts above the respective designations indicate the number of operations in which the respective totalizers were involved. In view of the fact that the instant invention is not concerned with these counting mechanisms, and since they are well known in the art, the counters 5 and 6 have been indicated only schematically in the drawings. The lever 4 is locked out by means not shown in the drawings, if one of the amount levers 2 is set, i. e. only the lever 3 can be operated. There is no possibility of operating the machine without one of the levers 3 or 4 being used. The lever 4 can only be operated if all the levers 2 and 3 are in the zero position.

A printing device 7 of a known kind can be fitted to the machine on the left hand side of same. By means of the said printing device a detail strip, a ticket and an inserted slip can be printed. The other drawings show only the arrangement of the type wheels.

*The setting mechanism for the amounts*

Figure 4:
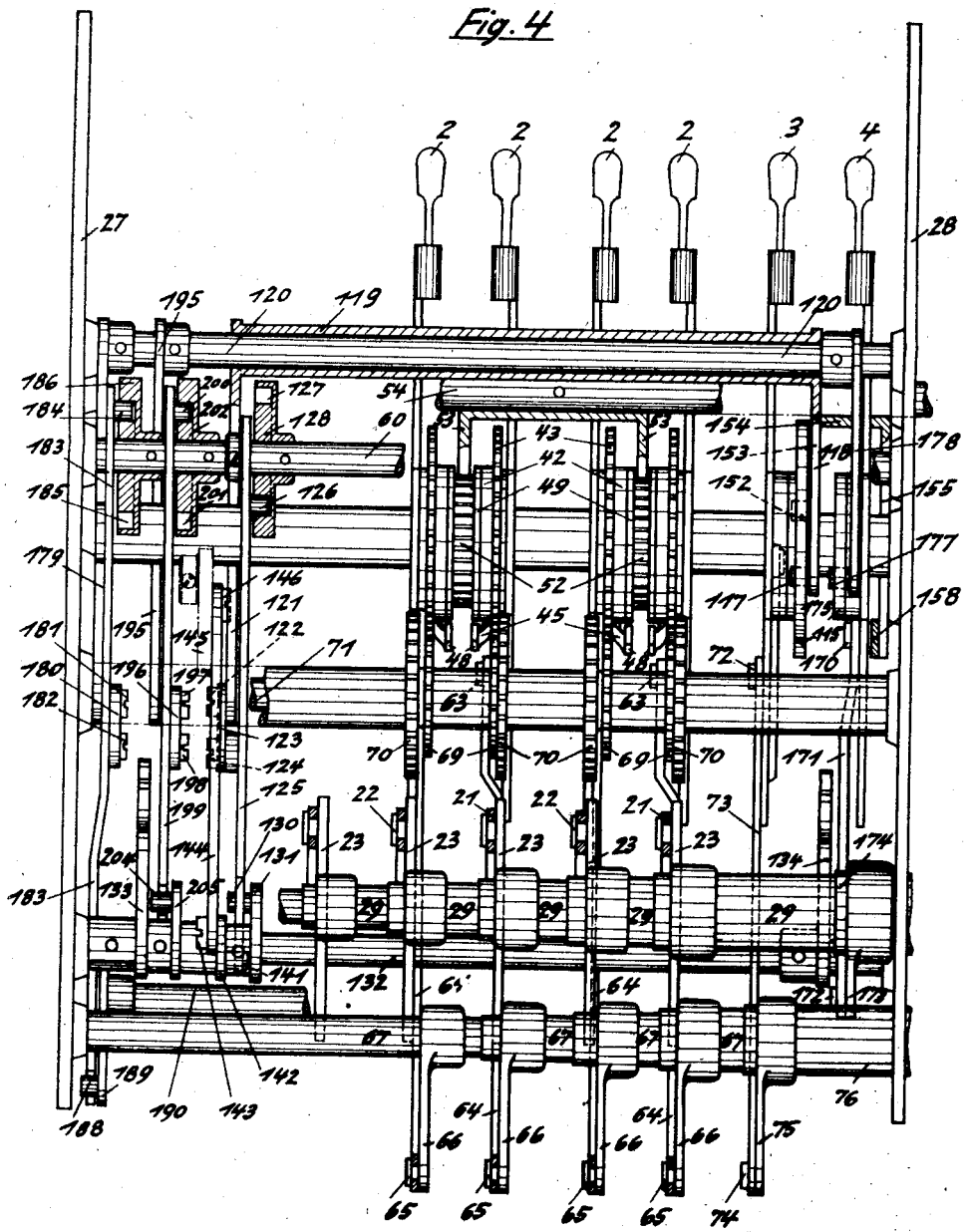
Fig. 4 is a fragmentary view of the setting and controlling mechanisms.
Figure 5:
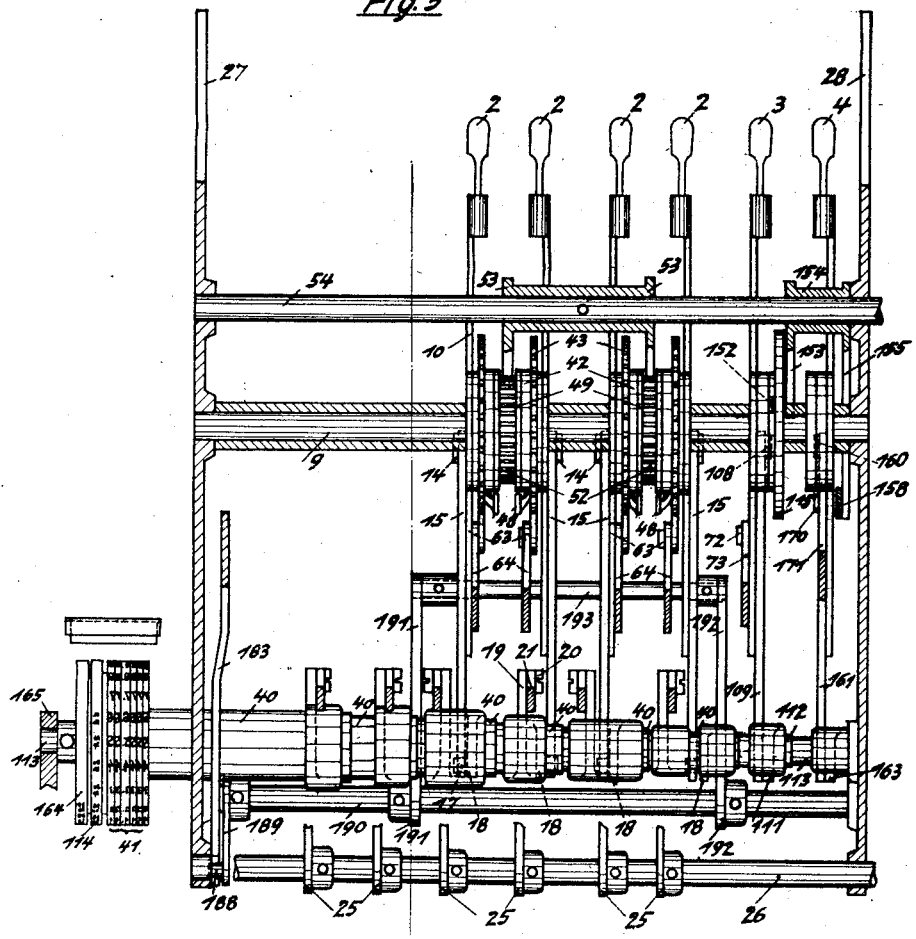
Fig. 5 is a fragmentary view of the setting mechanism and the arrangement of the printing types.

The levers 2 for setting the amounts are rotatably mounted on a shaft 9 secured to the frames 27 and 28 (Figs. 4 and 5). The levers 2 (Fig. 6) are constructed as toothed segments 10. Pawls 11, rotatably assembled on a rod 12 engage the spaces between the teeth of these segments by the force exerted by springs 13. The pawls 11 arrest the setting levers in the position which they are set in. The connecting rods 15 are movably associated with the setting segments 10 by means of studs 14. The rods 15 are provided with slotted lugs 16 cooperating with pins 17 of the levers 18. The toothed segments 23 and the arms 19 are movably connected by connecting rods 21 and studs 20 and 22. The toothed segments 23 are secured to hollow shafts 29 (Fig. 4).

In amount setting operations the movement of the segments 23 and hollow shafts 29 with the amount setting levers 2 is an idle one, but in new balance operations the segments 23 and hollow shafts 29 transmit totals from the balance mechanism to one of the new balance totalizers. The connections between the segments 23 and arms 19 are provided for the setting of the type wheels in "New balance" operations, as will presently be explained.

Figure 6:
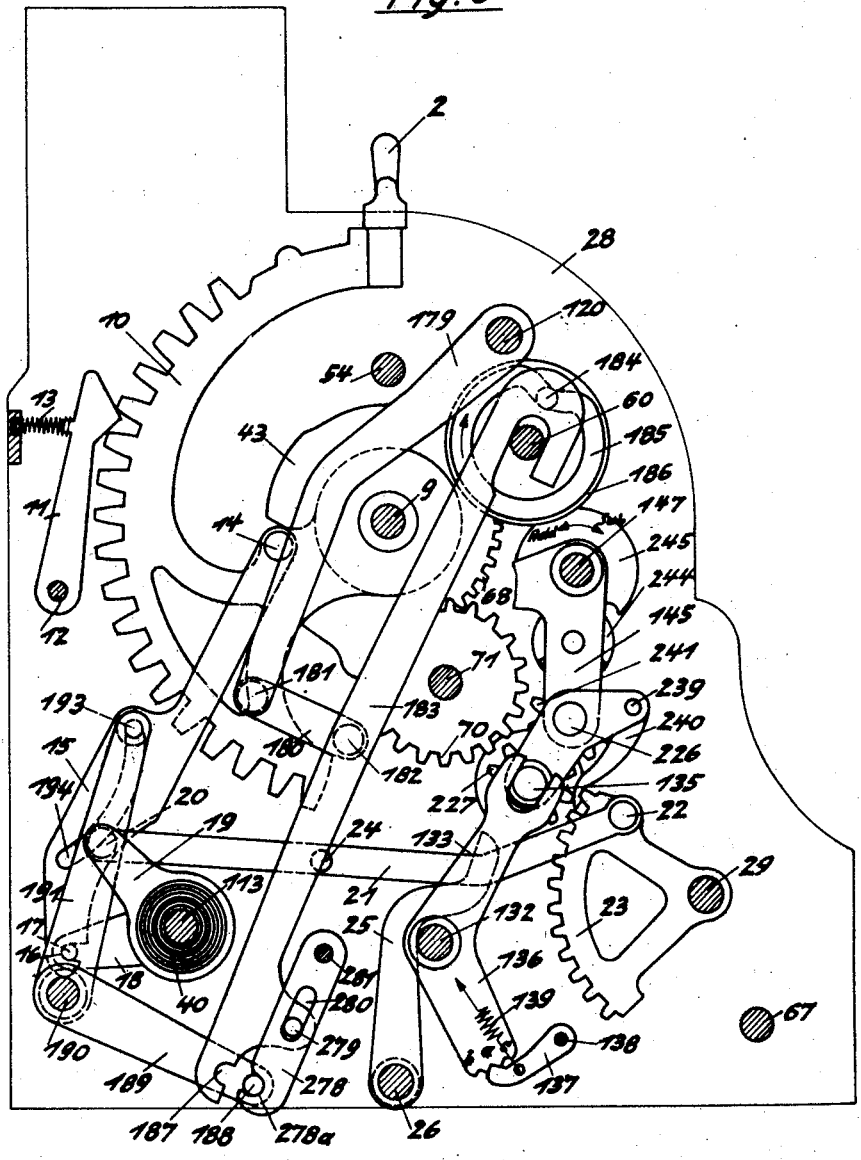
Fig. 6 is a side view of the amount setting mechanism on line 6—6 Fig. 3.

The connecting rods 21 carry pins 24 which cooperate with arms 25 secured to a shaft 26 (Fig. 6). The shaft 26 is rotatably mounted in the frames 27 and 28.

On the right hand side of the frame 28 the shaft 26 carries an arm 30 operated by a spring 31 (Fig. 12). A pitman 33 is pivotally mounted on the arm 30 by a stud 32. The pitman 33 is guided by a stud 35 projecting through an elongated hole of the pitman and fastened to the frame 28. The anti-friction roller 36 works in connection with the cam 37 secured to a gear 38. The latter one is fixed on the main shaft 39. As described hereinafter, the main drive shaft 39 operates rocking shaft 26 which operates arms 25 against pins 24 (Fig. 9) to restore at the proper time the amount setting means and printing means to the zero positions.

The arms 18 (Fig. 6) are secured to sleeves 40 rotatably mounted on a shaft 113 extending between the frames 27 and 28. On the left hand side of the frame 27 (Fig. 5) the amount type wheels 41 are secured to the sleeves 40.

Notched disks 42 are rigidly connected with the adjusting segments 10 (Fig. 9). Toothed disks 43 are rotatably arranged between the segments 10 and the disks 42. The latter cooperate with double pawls 45 pivotally mounted on the toothed disks 43 by studs 46 and operated by the springs 47. The upwardly extending arm 44 of the double pawl 45 is in mesh with the notch 44a of the disk 42. The downwardly extending arms 48 of the double pawls 45 work together with an actuating disk 49. The latter one is fitted with a projection 50 which cooperates with adjustable stops 51 of the disks 43. The actuating disks 49 are fixed to gears 52 which mesh with segments 53 fixed on the shaft 54 (Fig. 9).

The shaft 54 is rotatably mounted in the frames 27 and 28 and carries an arm 55 on the right hand side of the frame 28 (Fig. 12). By the aid of studs 56 and 57 and the connecting rod 58 the arm 55 is movably connected with the gear 59 secured to the shaft 60. The latter shaft is rotatable in the frames 27 and 28. The gear 59 meshes with the gear 61 loosely mounted on the stud 62. The gear 61 engages the gear 38 fixed on the main shaft 39.

The toothed disks 43 are movably connected with the arms 66 by means of the studs 63 and 65 and the connecting rods 64. The arms 66 are secured to the hollow shafts 67 (Fig. 9). The latter transmit the amounts set by the setting levers 2 to the selected totalizer of the first group as hereinafter explained. The teeth 68 of the disks 43 mesh with the gears 69 fixed to gears 70. The gears 69 and 70 are rotatably mounted on a shaft 71 fixed in the frames 27 and 28.

The lever 3 (Fig. 10) for selecting the totalizers of the first group is movably connected with the arm 75 by means of the studs 72, 74 and a connecting rod 73. The arm 75 is fixed on a hollow shaft 76 rotatably mounted on the hollow shafts 67. The hollow shaft 76 transfers the movement of the lever 3 to the controlling mechanism for selecting one of the six totalizers of the first group 168. The totalizers of this group are arranged between the frames 77 and 78, Figs. 3, 13 and 15, in the manner disclosed in German Patent No. 209,737, May 13, 1909.

On the left hand side of the frame 77 there is secured an arm 79 on the hollow shaft 76 (Fig. 13). The arm 79 is movably connected with an arm 83 of the segment 84 by means of the studs 80, 81 and the connecting rod 82. The segment 84 is fastened on a shaft 85 rotatably mounted in the frames 77 and 78. On the right hand side of the frame 78 (Fig. 13c) there is also fixed a similar segment 84 on the shaft 85. Both segments 84 mesh with toothed plates 86 which by the aid of elongated holes are slidably movable in a vertical direction on studs 87 and 88 secured to the frames 77 and 78. By the aid of slots, plates 91 are shiftable in a horizontal direction on studs 89, 90 of the plates 86. The plates 91 are fitted with elongated holes 92 and 93 engaging pins 94 and 95 of the arms 96 and 97 rotatably mounted on studs 98 and 99 secured to the frames 77 and 78. The arms 96 and 97 are formed as double arms and are connected together by means of the studs 100, 101 and the connecting rods 102 in such a way that both arms execute the same movement. Pitmans 104 are loosely mounted on the double arms 96 by studs 103. The pitmans 104 are guided on the main shaft 39 by slotted lugs and carry anti-friction rollers 105 which engage the cam race 106 of the pitman cam 107 fixed on the main shaft 39.

The plates 91 are provided with engaging parts 166 which cooperate by means of an angular part 166b with the studs 167 of the frames 168b in which are mounted the shafts 168 of the first group of totalizers A—F. The engaging parts 166 are so arranged on the plates 91 that on adjusting the said plates 91 two engaging parts 166 engage the corresponding studs 167 of the selected totalizer 168 on both sides of the frames 77 and 78 (Figs. 13, 13b, 13c and 15) and move the totalizer to the right.

The plates 86 have slots 169 in those places where the actuating parts 166 are fastened to the plates 91. The slots 169 admit the studs 167 of the selected totalizer.

The lever 3 is connected with the arm 111 by means of the studs 108, 110 and the connecting rod 109 (Figs. 5 and 10). The arm 111 is fastened to a hollow shaft 112 rotatably mounted on the shaft 113. On the other side of the machine on the left of the amount type wheels 41 there is a type wheel 114 on the hollow shaft 112 which carries the printing symbols for the 6 different totalizers of the first group to be adjusted (Figs. 3 and 5).

The lever 3 (Fig. 10) is fitted with a plate 115 which carries a cam-race 116 working in connection with an anti-friction roller 117 of the lever 118. The latter is secured to a hollow shaft 119 which turns loosely on the shaft 120 (Fig. 4 and 10). At the other end of this hollow shaft 119 (Figs. 4 and 8) there is fixed a lever 121 which at its lower end is movably associated with a link 123 by means of a stud 122.

By the aid of a stud 124 the link 123 is movably connected with a pitman 125 the upper forkshaped end of which is slidably guided on a shaft 60. The pitman 125 is fitted with an anti-friction roller 126 which engages a cam race 127 of a pitman cam 128 rigidly connected with the shaft 60. At its lower end the pitman 125 has a slot 129 which cooperates with a stud 130 of an arm 131. The latter arm is fixedly connected with the shaft 132. The shaft 132 carries two arms 133 and 134 (Fig. 19) which are also fixedly connected with the shaft 132. The arms 133 and 134 mesh in a fork shaped way with a shaft 135 of the balance mechanism. An exact description of this adding mechanism follows hereinafter. The arm 133 (Fig. 8) carries a plate 136 which is fitted with three recesses a b c. A pawl 137 engages these recesses which, subject to the action of a spring 139, is loosely pivoted on a stud 138.

The pitman 125 carries a slotted lug 140 which works in connection with a pin 141 of a two-armed lever 142. The latter is rotatably mounted on the shaft 132. By the aid of a stud 143 the two armed lever 142 is movably connected with a bell crank lever 145 by means of a stud 146 and a rod 144. The bell crank lever 145 is rotatably mounted on the shaft 147 which in turn is rotatable in the frames 27 and 28 (Figs. 8 and 19).

At its other end the lever 142 is provided with notches d and e which are engaged by pawl 148 rotatably mounted on a stud 149 of the frame 27. The pawl 148 is subject to the action of a spring 150.

The plate 115 (Fig. 10) carries a second cam race 151 which cooperates with an anti-friction roller 152 of an arm 153. The latter is connected with a lever 155 by a hollow shaft 154. By the aid of the studs 156, 157 and a connecting rod 158 the lever 155 is associated with a rocking plate 159 (Figs. 10 and 11). The latter carries the coupling gears for the balance mechanism. The said mechanism will be described hereinafter.

The lever 4 for selecting the two totalizers for the new balances "Credit" and "Capital" is movably connected with an arm 163 by means of the studs 160, 162 and a connecting rod 161 (Fig. 11). The arm 163 is fixed on the shaft 113 which at its other end carries the type wheel 164 with the printing symbols for the new balances (Fig. 5). The shaft 113 is rotatably mounted in a bearing 165 fastened to the frame 128 marked only in Fig. 5.

Figure 13A:
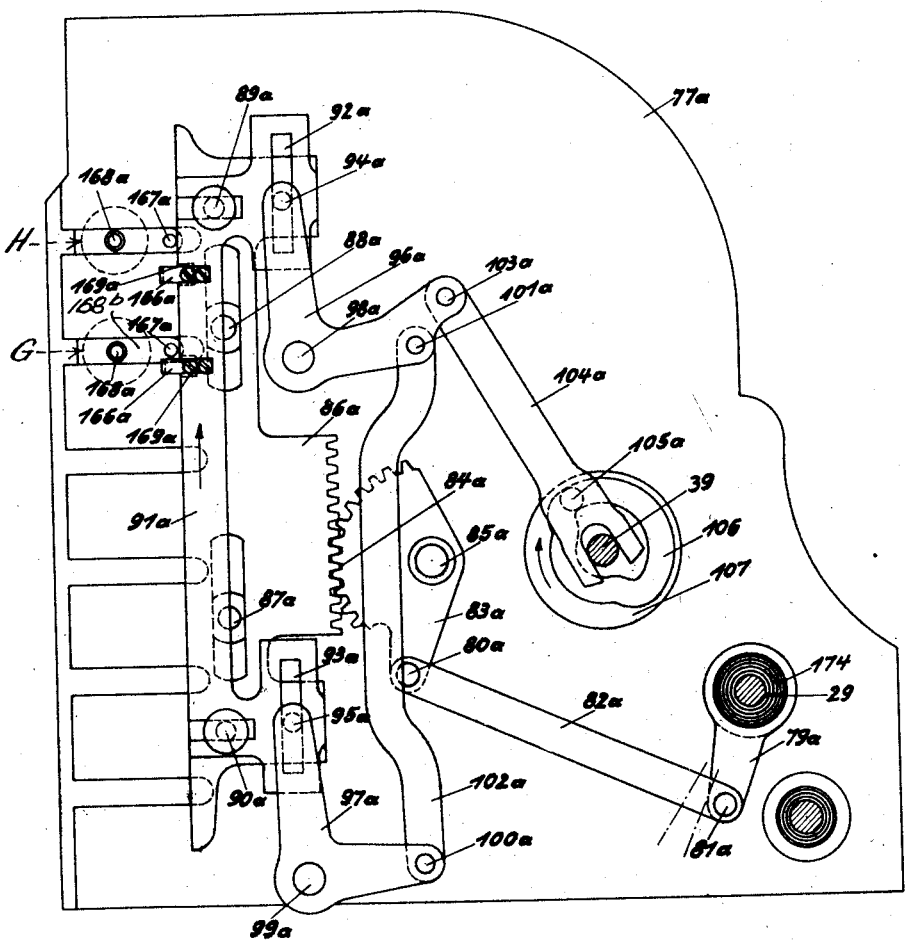
Fig. 13a is a side view of the selecting mechanism for the new balance totalizers on line 13a—13a of Fig. 3.
Figure 13B:
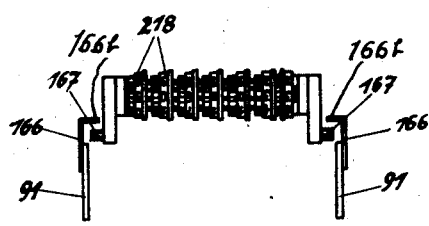
Fig. 13b is a simplified plan view of the first group of totalizers, showing parts of their selecting mechanism.

The lever 4 is connected with an arm 173 by means of the studs 170, 172 and a rod 171 (Fig. 11). The arm 173 is connected with an arm 79a by a hollow shaft 174 (Figs. 3 and 13a). The arm 79a is movably connected with a toothed segment 84a by means of the studs 80a, 81a and a connecting rod 82a. The remainder of the adjusting mechanism for the totalizers G and H for the "New balances" is exactly the same as that for adjusting the six totalizers of the first group. The two totalizers for the "New balance credit" and "New balance capital" are mounted between frame walls 77a and 78a in the same manner as the totalizers of the first group, which are not shown in Fig. 3 for the purpose of clarifying the drawings. The mounting of these totalizers is disclosed in German Patent No. 209,737 mentioned above, Figs. 1, 3 and 4.

The lever 4 is provided with a plate 175 being fitted with a cam race 176 (Fig. 11). An anti-friction roller 177 of an arm 178 engages the aforesaid cam race. The arm 178 is secured to the shaft 120 rotatably mounted in the frames 27 and 28. Fastened on the left hand end of the shaft 120 is a lever 179 movably connected with a pitman 183 by the studs 181, 182 and a connecting rod 180 (Figs. 4 and 6). At its upper end the pitman 183 is slidably guided on shaft 60 and carries an anti-friction roller 184 which engages a cam race 185 of a pitman cam 186 secured to the shaft 60. At its lower end the pitman 183 is provided with a slotted lug 187 which cooperates with a pin 188 of an arm 189. The pitman 183 also carries a pin 279 engaging a slot 280 of a lever 278. The latter is pivotally mounted on a stud 281 and fitted with a slotted lug 278a which works in connection with the pin 188. The arm 189 is fixed on a shaft 190 (Fig. 5 and 6) rotatably mounted in the frames 27 and 28. The two arms 191, 192 are secured to the shaft 190 and at their upper ends are connected by a rod 193. The slots 194 of the connecting rod 15 slide on the rod 193.

Secured to the shaft 120 is also a lever 195 (Figs. 4 and 7) movably connected with the pitman 199 by the studs 197, 198 and a link 196. At its upper end the pitman 199 is slidably guided on the shaft 60 and is provided with an antifriction roller 200 engaging a cam race 201 of the pitman cam 202 fixed on the shaft 60. The pitman 199 is fitted at its lower end with a slotted lug 203 engaging a pin 204 of an arm 205 secured to the shaft 132.

*The transmission of the amounts set to the totalizers of the first group*

In the foregoing have been explained the setting mechanisms so far as they concern the levers 2 for the amounts.

The hollow shafts 67 carry arms 206 (Fig. 15) at their right hand ends. The latter are connected with arms 210 of segments 211 by the aid of the studs 208, 209 and the links 207. The segments 211 are rotatably mounted on a rod 212 fixed in the frames 77, 78 and mesh with the racks 213 which are slidably guided by slots in a vertical direction on rods 214, 215, secured to the frames 77, 78. The racks 213 are fitted with teeth 216 with which gears 217 of the adding wheels 218 mounted on shaft 168 of the selected totalizer can be moved into engagement as previously described. The details of the engaging mechanism are disclosed in German Patent No. 209,737 and this disclosure is applicable to the totalizers of the second group containing the totals of the new balances, as well as to the totalizers of the first group.

If one of the adding wheels of the totalizers of the first group and the totalizers for the "New balances" turns from 9 to 0 the following mechanisms are provided for transferring one unit to the next higher denomination. Arranged by the side of each rack 213 (Fig. 14) are plates 219 which are slidably guided in a horizontal direction on the rods 214, 215. The plates 219 are fitted with arms 220 slidably guided on the main shaft 39 and provided with anti-friction rollers 221 engaging cam races 222 of pitman cams 223 fastened to the main shaft 39. The cam races 222 are arranged so that the plates 219 are moved successively. The details of the aforesaid transfer mechanisms do not form part of the invention and therefore there is no necessity of explaining them.

Reference as to details is made to German Patent 209,737.

*The balance mechanism*

The construction of this mechanism which may be termed a balance mechanism, permits the amounts to be added and subtracted. For this purpose controlling mechanisms are provided to control the turning movement of the adding parts during the adding or subtracting operations.

Loosely mounted on the shaft 147 (Fig. 19) is an arm 224 which is connected with the bell-crank lever 145 by rods 225, 226. The just mentioned parts form together a frame in which the adding mechanisms are assembled. The gears 227 are connected with disks 229 by hubs 228 and are rotatably mounted on the shaft 135 (Figs. 19 and 20). On studs 230 the disks 229 carry pivoted double pawls 231 operated by springs 232. One arm of each of the double pawls 231 is fitted with a pin 233 which protrudes through a slot of the disk 229. The other arm of each of the pawls 231 works in connection with a cam 234 secured to the shaft 135. The latter shaft is rotatably mounted in the arms 235, 236 (Fig. 19). The arms 235, 236 are loosely mounted on the rod 226 and carry a rod 239 fastened to their ends 237—238.

Arranged on the rod 239 are arms 240 which at their lower ends cooperate with the studs 233 of the double pawls 231. In the zero position of the disks 229 the double pawls 231 are held out of engagement with the cams 234 so that the disks 229 and their pawls 231 turn without any effect upon the cams 234. Gears 241 are rotatably arranged on the rod 226 (Figs. 19, 21) and mesh with the gears 227. The gears 227 and 241 have the same number of teeth and, in view of this relationship, the gears 227 may be construed as counting wheels and the gears 241 as reversing pinions, since they always rotate in opposite directions. By means of hubs 242 the gears 241 are connected with the cams 243 which work in connection with transfer members 244 loosely mounted on the rod 225. The transfer members consist of two three toothed pinions of which the section 244a cooperates with the cams 243 and 245. The other section 244b works together with the gear 241 of the next higher denomination. The cams 245 fixed on the shaft 147 are provided with slots 246 and 247. The cams 245 fastened to the shaft 147 have different shapes and are so arranged (Fig. 22) that by turning them clockwise or counterclockwise they work successively from right to left in Fig. 19, i. e., the cam on the extreme right is effective first and the remaining ones are successively effective from right to left on account of the different placement of the notches 246, 247 in the several cams dividing the effective actuating portions from the ineffective portions. 245a. This arrangement in transfer mechanisms is known and the same is necessary if a transfer is prepared while the shaft 147 is turning. The section 245a of each of the cams 245 is a little smaller in diameter than the remaining section.

Fixed on the right hand side of the shaft 147 is a gear 248 (Fig. 19) with which cooperates one of the gears 249 and 250 (Fig. 10) accordingly as the amounts are to be added or subtracted. Both mentioned gears 249 and 250 are loosely mounted on studs 252 and 251, respectively, fastened on the rocking plate 159 (Figs. 10 and 11). The latter is rotatably fitted on a stud 253 fixed in the frame 28. The gear 249 meshes directly with the gear 254 whereas the gear 250 is connected with the gear 254 by the aid of an intermediate gear 255. By this arrangement the gear 249 turns in opposite direction as compared with the turning movement of the gear 250. The intermediate gear 255 is loosely mounted on the stud 256, and the gear 254 is loosely mounted on the stud 257. The gear 254 meshes with the gear 258 rotatably mounted on the stud 253. The gear 258 engages the gear 259 loosely mounted on the stud 260. In connection with the gear 259 are a locking plate 263 and a gear 261 of the same diameter as gear 259. The gear 261 cooperates with the gear 262 on the shaft 135 (Fig. 19). The gear 259 cooperates also with the segment 265. The latter is rigidly connected with the gear 266 and the plate 264 working in connection with the plate 263. The three parts 264, 265 and 266 are rotatably mounted on the stud 267. The gear 269 loosely mounted on the stud 268 meshes with the gear 266 and the gear 270 fastened on the shaft 271. The shaft 271 is rotatably mounted in the frames 28 and 77a. On the right hand side of the frame 28 the gear 272 is fixed on the shaft 271 (Figs. 12 and 16). The gear 274, loosely mounted on the stud 273 meshes with the gears 272 and 38 fastened on the main shaft 39.

On the right hand side of the frame 78 (Fig. 3) a gear 275 is secured to the shaft 39. The gear 275 meshes with the gear 276 provided with a handle 8 and rotatably mounted on a stud 277 fastened in the frame 78.

The mechanism works in the following way:

FIRST OPERATION

1. *The registration of the old balances on the totalizers for the old balances and on the balance mechanism*

For this purpose the amount levers 2 are set in accordance with the amount of the old balance. The totalizer selecting lever 3 is moved into one of the positions "Old balance" for instance into the position "Old balance credit".

Figure 14:
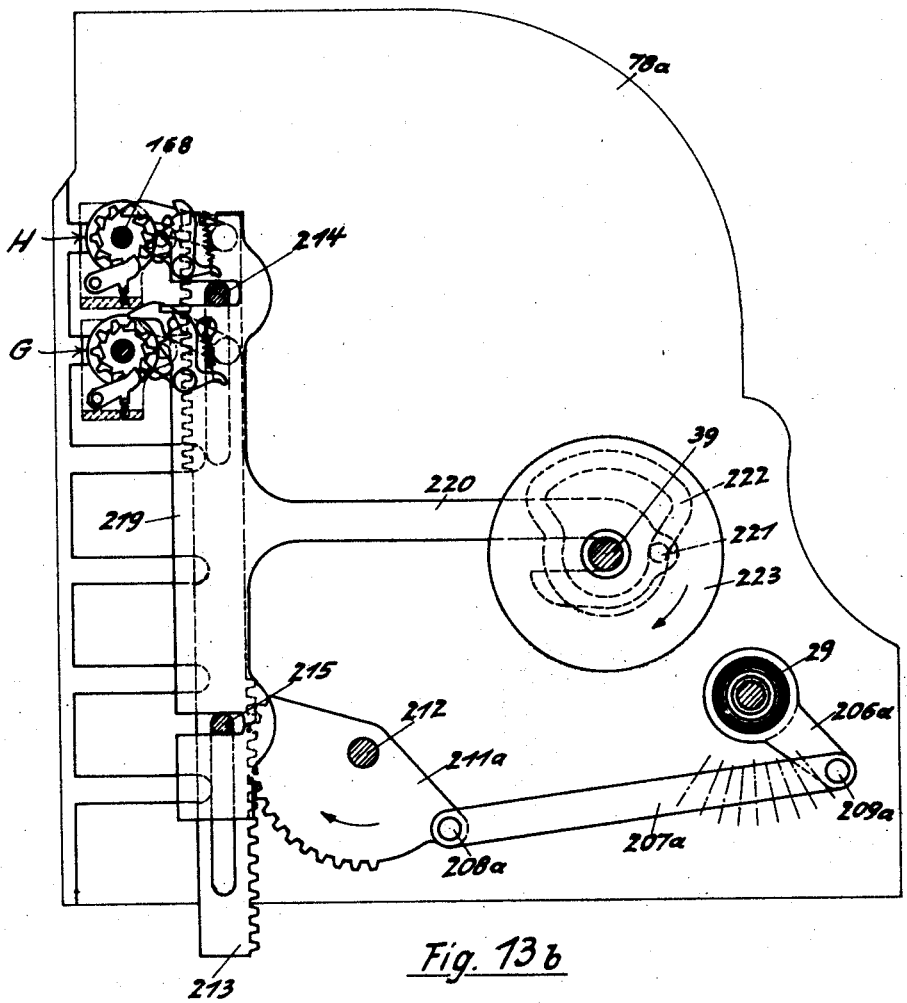
Fig. 14 is a side view of the amount transmitting mechanism for the new balance totalizers, on line 14—14 of Fig. 3.

By the aid of the link 109, (Figs. 5, 10), the arm 111 and the hollow shaft 112 the movement of the lever 3 is transmitted to the type wheels 114 with the result that the printing symbol for "Old balance credit" is turned into printing position (Figs. 5 and 10). The setting of the amount type wheels 41 is effected by the connecting rods 15 (Figs. 5 and 6). The slotted lugs 16 of the latter engage the studs 17 of the arms 18 and are held in this engagement by the aid of their slots 194 which engage the rod 193 of the arms 191, 192 fastened on the shaft 190. Fixed on the latter is an arm 189 fitted with a pin 188 which engages the slotted lug 278a of the lever 278. The movement of the arms 191 and 192 is thereby prevented (Fig. 6). The arms 18, the hollow shafts 40 and the amount type wheels 41 are turned in accordance with the amount set on the amount levers. The arms 18, being associated with the arms 19, the connecting rods 21 also move the toothed segments 23. The latter ones transfer this movement to the arms 206a by the aid of the hollow shafts 29 (Figs. 3, 6 and 14). The toothed segments 211a and the racks 213 participate in this movement by means of the links 207a. However, the above described movement has no effect upon the totalizers for the new balances owing to the fact that these totalizers have not been moved into operating position.

The controlling mechanism for moving the totalizer "Old balance credit" into its working position is set by the control lever 3 in the following way: By means of the connecting rod 73, and the arm 75, the hollow shaft 76 and the arm 79 are moved according to the setting of the lever 3 (Figs. 3, 10 and 13). The connecting rod 82 transmits this movement through the segment 84 to the plate 86 (Fig. 13). The lower actuating part 166 fastened to the plate 86 is moved so that it meshes with the stud 167 of the totalizer arranged on the lowest shaft 168.

By means of the shaft 85 (Figs. 13, 13c) the same controlling mechanism (parts 84, 86, 166) being assembled on the right hand side of the frame 78 is also moved and the corresponding actuating part 166 meshes with the corresponding stud 167 of the selected totalizer.

The transmission of the amounts set by the amount levers 2 to the totalizer "Old balance credit" and to the balance mechanism is effected in the following way. The notched disks 42 which, as explained above, are rigidly connected with setting segments 16, are turned clockwise by so much as the amount levers are moved (Fig. 9). From the beginning of this movement the arms 44 of the double pawls 45 come out of engagement with the notches 44a of the notched disks 42 by a camming edge at each of these notches in the disks 42. They turn against the action of the springs 47 and their arms 48 come into engagement with the actuating disks 49. By the subsequent driving movement imposed upon the actuating disks 49, the pawls 48 are entrained at their faces 48a by the edges 49a of the actuating disks 49. The movement of the pawls with their pivotal mountings 46 on toothed disks 43, advances the latter until the arms 44 of the pawls drop into the notches 44a of the setting segments 42; whereupon the further movement of actuating disks 49 are without effect upon the toothed disks 43.

On operating the handle 8 the main shaft 39 is turned by the aid of gears 276 and 275 (Fig. 3). By the aid of the intermediate gear 61 and the gear 59 the rotation of the gear 38 is transmitted to the shaft 60 (Fig. 12). By means of the connecting rod 58, the crank pin 56, being on the gear 59, gives the arm 55 as well as the shaft 54 a rocking movement of about 90 degrees. In this movement participate the segments 53 and the gears 52 with their actuating disks 49 (Figs. 5 and 9). The steps or edges 49a of the latter work against the faces 48a of the arms 48 of the double pawls 45, and by the aid of the studs 46 the toothed disks 43 participate in this movement until by the action of the springs 47 the double pawls 45 engage the notches 44a of the disks 42. In this movement the arms 48 slide on the circular section 49b of the actuating disks 49 and prevent the arms 44 of the pawls from disengaging from the notches 44a of the disks 42. The gears 69 and 70 (Fig. 9) are actuated by the movement of the toothed disk 43. On operating the totalizer selecting lever 3, the lever 118 is moved by the aid of the cam race 116 of the plate 115 (Fig. 10). This movement of lever 118 (Fig. 4) is transferred to the pitman 125 (Fig. 8) by means of the hollow shaft 119, the lever 121 and the link 123. The pitman 125 is moved until the projection 129a engages the pin 130 of the arm 131 (Figs. 4 and 8). In the normal position of the machine the arm 131 is arrested by an arm 136. The latter is provided with 3 notches b, a, c. The pawl 137, being pivotally mounted on a stud 138 of the frame 28, engages with the notch a of the arm 136 and is subject to the action of the spring 139. The arm 136 is rigidly mounted on shaft 132 and has arm 133 extending therefrom. Another arm 134 is fixed upon shaft 132 adjacent frame 28. Both arms 133 and 134 (Fig. 19) are forked at their upper ends and engage at these sections the shaft 135 of the balance mechanism.

By the aid of the parts 276, 275, 39, 38, 61 and 59 the shaft 60 is turned on operating the handle 8 (Figs. 3 and 12). The pitman cam 128 rotates together with the shaft 60 and the cam race of the former moves the pitman 125 downwards (Fig. 8). The projection 129a cooperating with the pin 130 turns the lever 131 and consequently the shaft 132 and the arms 133, 134. The forked upper ends of the arms 133, 134 move the shaft 135 with the result that the gears 227 engage the gears 70. During this movement the spring operated pawl 39 engages the slot b of the arm 136 (Fig. 8). The aforesaid engagement of the gear 227 with the gears 70 occurs shortly before the movement of the toothed disks 43 and the gears 69 and 70 (Fig. 9). In the movement of the gears 70 participate also, as previously described, the gears 227 with the result that the amounts set by the amount levers 2 are transferred to the said gears 227 in the "Add" direction (Fig. 21).

Figure 15:
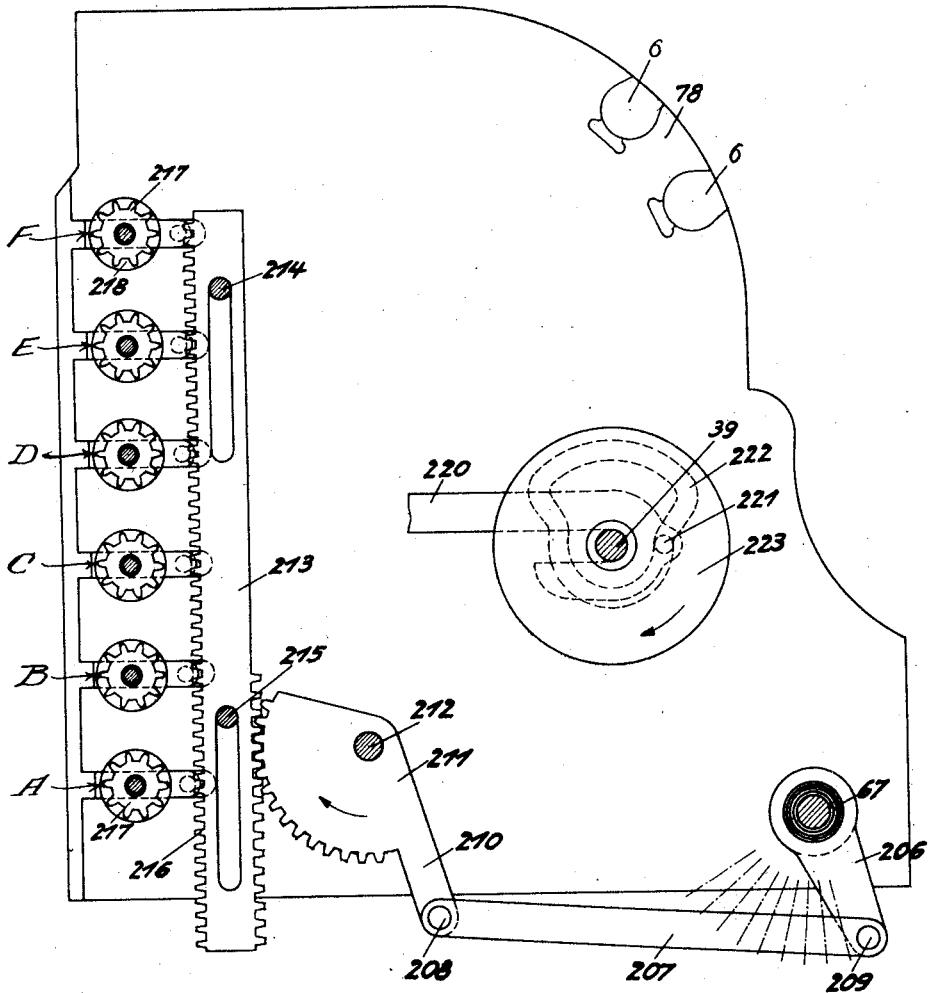
Fig. 15 is a side view of the amount transmitting mechanism for the totalizers of the first group on line 15—15 of Fig. 3.

The transfer of the amounts set by the amount levers 2 to the selected totalizer "Old balance credit" is effected in the following way. The movement of the toothed disk 43 is transmitted to the racks 213 by the aid of the links 64, the arms 66, the hollow shafts 67, the arms 206, the links 207 and the segments 211 (Figs. 9, 3 and 15).

The two pitman cams 107 assembled by the side of the frames 77, 78 (Fig. 3) participate in the turning movement of the main shaft 39. Their cam races move the pitmans 104 by the aid of the link 102, the double arms 96, 97 and the plates 91 with their actuating parts 166 (Fig. 13). The latter engage the studs 167 of the selected totalizer and move thereby the gears 217 of the adding wheels 218 into engagement with the teeth 216 of the racks 213, shown in detail in Fig. 15, but omitted from Fig. 3 between plates 77 and 78 to simplify the drawings. The totalizers of the first group between plates 77 and 78 are of the same construction as the totalizers of the second group between plates 77a and 78a, some of the parts of which, 213, 217, 218 and 219, are shown in Fig. 3. As explained above, the details of this totalizer arrangement are disclosed in German Patent No. 209,737.

The above described engagement of the gears 217 with the racks 213 occurs shortly before the racks 213 are moved as previously explained. The gears 217 take part in the movement of the racks 213 i. e. according to the amount set.

In the event of an adding wheel 218 exceeding the number 9, a unit is transferred to the next higher order. This is effected in the following manner. The anti-friction rollers 221 engaging the cam races 222 of the pitman cam 223 move the plates 220 during the revolution of the main shaft 39 (Fig. 14). The pitman cams and their cam races are so arranged that the plates 220 are moved successively from left to right (Fig. 3) after the transmission of the amounts set to the adding wheels 218 has taken place. The mechanisms of the said transfer device are known in the art and therefore are only designated in the Figures 3 and 14. For this reason there is no necessity of describing these mechanisms in detail.

After the amount set has been transferred to the totalizer "Old balance credit", this totalizer is disengaged from the racks 213 by means of the parts 91, 96, 97, 102, 104 and 107 (Fig. 13).

The backward movement of the racks 213 occurs in the following manner. After the complete transmission of the amount set to the totalizer "Old balance credit" and the balance mechanism has taken place, the connecting rod 58 moves the arm 55, the shaft 54, the segments 53, the gears 52 and the actuating disks 49 backwards (Figs. 9 and 12). Before this backward movement, the section 50 is so far ahead of stop 51 in a clockwise direction as the difference between the extent of travel of actuating disk 49 and that of toothed disk 43 with the pawl and stop 51 thereon before the disk 43 had been arrested by the arm 44 of the pawl dropping into the notch 44a in the setting disk 42. The counterclockwise rotation of actuating disk 49 during the backward movement is thus idle until section 50 comes in contact with stop 51 to bring it and the parts connected therewith back to the position shown in Fig. 9. By the aid of their studs 46 the double pawls 45 participate in this movement, and their upper ends are disengaged from the notches 44a of the disk 42 fastened to the amount levers 2 through the setting segments 10. The faces 48a of the arms 48 are permitted to drop adjacent the steps 49a of the actuating disks 49 when sections 50 on the latter arrived adjacent the stops 51. By the aid of the links 64, the arms 66, the hollow shafts 67 (Fig. 9), the arms 206, the links 207 and the segments 211 the movement as above described is transmitted to the racks 213 (Fig. 15). The movement of the said parts is not finished until same are in their normal position.

Shortly before the backward movement of the segments 53 occurs, the pitman cam 128 operates the pitman 125 (Fig. 8). By the aid of the pin 130, the pitman 125 turns the arms 136, 133 and 134 and moves the shaft 135. Owing to this movement the gears 227 are disengaged from the gears 70.

After this has taken place, the gears 70 and their associated gears 69 can participate in the backward movement of the toothed disks 43.

Thereupon the cam 37 connected with the main shaft 39 works against the anti-friction roller 36 and moves the pitman 33 (Fig. 12). The latter turns the arm 30 and the shaft 26 against the action of the spring 31 (Fig. 12). The arms 25 secured to the shaft 26 operate against the pins 24 of the connecting rods 21 and move same into their zero position (Fig. 9). In this movement participate the arms 19, the arms 18, the connecting rods 15, (Fig. 6), the amount levers 2, the hollow shafts 40 and the amount type wheels 41. In addition to the above mentioned parts, the segments 23, the hollow shafts 29, the arms 206a, the links 207a the segments 211a and the racks 213 (Fig. 14) participate also in this backward movement. The registration of an amount for "Old balance credit" is finished.

During the movement of the totalizer selecting lever 3 into its normal position the cam race 116 of the plate 115 moves the arm 118 to the left (Fig. 10). The arm 121 participates in this movement by means of the hollow shaft 119. By the aid of the link 123 the arm 121 moves the pitman 125 into that position which is shown in Fig. 8. The cam race 151 of the plate 115 simultaneously moves the lever 153, the hollow shaft 154 and the lever 155 (Fig. 10). By the aid of a link 158 the lever 155 moves the plate 159 into such a position that none of the gears 249 and 250 is in engagement with the gear 248. The link 109 connected with of the shaft 147. The link 109 connected with the arm 111 moves the hollow shaft 112 and the type wheel 114 into its rest position (Figs. 5 and 10).

SECOND OPERATION

2. *The registration of a credit or capital amount on the corresponding totalizers of the first group and on the balance mechanism*

If a credit or capital amount is to be additively registered, the amount levers 2 (Fig. 1) are set in accordance with this amount, and the totalizer selecting lever 3 is moved into one of the positions "Add credit" or "Add capital". By the aid of the parts 109, 111 and 112 the movement of the totalizer selecting lever 3 is transmitted to the type wheel 114 (Figs. 5 and 10).

The following mechanisms participating in the operation for registering a credit or capital amount have been described already in the heading "First operation":

(a) The adjustment of the amount type wheels 41

(b) The adjustment of the controlling mechanism for the totalizers for instance "Add credit"

(c) The controlling mechanism for the balance mechanism (d) The transmission of the amounts set to the totalizers for instance to "Add credit" and to the balance mechanism.

If during this operation of the machine one of the gears 227 exceeds $\frac{1}{10}$ of its revolution as the amount is transmitted to the balance mechanism, the number "1" is transmitted to the next higher order. This occurs in the following way. In engagement with the gears 227 are the gears 241 (Fig. 19) connected with cams 243 by hubs 242. If one of the gears 227 exceeds $\frac{1}{10}$ of its revolution, the cam 243 works against one of the three transfer teeth 244a and turns same until the next tooth 244a engages the section 245a of the cam 245. During the revolution of the shaft 147 in the direction "Add" of Fig. 21 the cam 245 works against the aforesaid tooth 244a and turns the latter on the rod 226. During this movement, one of the teeth 244b belonging to the displaced tooth 244a meshes with the gear 241 of the next higher unit and adds 1. The gear 241 operates the gear 227 and the parts pertaining to same.

The actuation of the shaft 147 takes place in the following manner: The gear 38 fastened to the main shaft 39 transfers its revolution to the gear 272 and the shaft 271 by the aid of the gear 274 (Fig. 12). On the other side of the frame 28 a gear 270 is secured to the shaft 271. By means of the gears 269, 266 the segment 265 and its connected locking disk 264 make one revolution (Fig. 10). The locking disk 264 works in connection with a locking disk 263 and the toothed segment 265 works together with the gear 259 (Fig. 16). By the aid of the just mentioned four parts the gear 259 does not turn in the first half of the revolution of the main shaft 39, and during the second half of the revolution of the main shaft 39 the said gear 259 makes a complete rotation on account of the ratio of the gearing. The turning movement of the gear 259 in the first half of the revolution of shaft 39 is prevented by the locking disks 263 and 265. This interruption of the turning movement of the gear 259 has been provided because during the transmission of the amounts set to the gears 227 the shaft 147 must be inactive. By means of the gears 253, 254, 255 the gear 259 is in connection with the gears 249 and 250. Owing to this arrangement the gear 249 turns clockwise and the gear 250 counterclockwise. Each of the mentioned two gears makes a complete revolution. According to the control exercised by the cam race 151 of the lever 3, the gear 248 meshes with the gear 249 or with the gear 250, and the shaft 147 turns clockwise or counterclockwise during the operation of the handle 8.

The backward movement of the setting and actuating mechanisms which have been displaced during this operation and the backward movement of the set amount levers and types occur as previously described in the heading "First operation".

If by the second operation an amount paid out is registered, the totalizer selecting lever 3, Fig. 10, is put into one of the positions "Deduct credit" or "Deduct capital". At such a setting the transfer of the registered amounts to the balance totalizer is effected in the subtractive sense.

The adjustment of the balance mechanism to substract the amount set occurs in the following way. If for instance the lever 3 is put into the position "Deduct credit" the cam race 116 of the plate 115 moves the lever 118 into the extreme right position (Figs. 10 and 4). By the aid of the hollow shaft 119, the lever 121, the link 123 and the pitman 125 participate in this movement (Fig. 8). The pitman 125 is moved so far that the pin 130 comes out of engagement with the projection 129a and the slotted lug 140 engages the pin 141 of the lever 142. The latter is provided with two notches e and d which are engaged by a pawl 148, actuated by a spring 150. The pawl 148 is pivoted on a stud 149 of the frame 27. The lever 142 is a double armed lever and is loosely pivoted on the shaft 132. The second arm of the lever 142 is connected by a link 144 with a lever 145, and loosely mounted on the shaft 147.

During the rotation of the shaft 60 the pitman cam 128 moves the pitman 125 downwards. By the aid of the slotted lug 140 and the pin 141 the double armed lever 142 participates in this movement. The latter turns around the shaft 132 and its other arm transfers this movement to the lever 145 by means of the link 144. By the aid of the rods 225 and 226 the lever 145 is firmly associated with the arm 224 and these four parts form together a frame in which the parts of the balance mechanism are assembled (Fig. 19). If the lever 145 is moved as previously described, the aforesaid frame is also moved, and the gears 241 arranged on the rod 226 engage the gears 70. The shaft 135 with its gears 227 is held in its rest position by the spring operated pawl 137 which engages the notch a of the arm 136 (Fig. 8). During the transmission of the amounts set by the amount levers 2 the movement of the gears 70 is transmitted indirectly to the gears 227 by means of the gears 241 with the result that the amounts are subtracted. If the amounts set by the amount levers 2 are to be subtracted, the tens transfer has to take place in the opposite way. It is effected as follows. By the aid of the anti-friction roller 152, the cam race 151 moves the arm 155, the hollow shaft 154 (Fig. 10), the link 158 and the plate 159 in such a way that the gear 250 meshes with the gear 248 of the shaft 147. As previously described, the gear 250 turns in the opposite direction as compared with the turning movement of the gear 249 and thereby also the gear 248 and the shaft 147 rotate in the opposite direction. On account of this arrangement the tens transfer occurs also in the proper direction for a subtractive operation.

The transmission of the amount set by the amount levers 2 to the selected totalizer "Deduct credit", the backward movement of the actuating mechanisms and that of the amount type wheels as well as of the amount levers 2 occur in the same manner as described in the heading "First operation".

Of course it is possible to register more than one amount (paid in or paid out) as already described under the heading "Second operation".

After the operation of the handle 8 is finished, the lever 3 must be put into its normal position. In this movement participate all the mechanisms which are in connection with said lever. An exact description of this movement has already been given in the heading "First operation".

THIRD OPERATION

3. *The transmission of the new balance to the totalizers for the "New balance"*

For this operation only the lever 4 is used. Lever 4 is set into one of the positions "New balance credit" or "New balance capital", in this case, for instance, into the position "New balance credit".

As already mentioned there are locking mechanisms preventing the levers 2 and 3 from being moved when the lever 4 is operated.

The cam race 176 of the plate 175 moves the lever 178 to the right (Fig. 11). The shaft 120 and the arms 179 and 195 (Figs. 4, 6 and 7) participate in this movement.

The lever 179 transfers this movement to the pitman 183 by the link 180 (Fig. 6). The pin 279 moves the lever 278 and disengages the slotted lug 278a from the stud 188 of the arm 189. At the same time the slotted lug 187 engages the pin 188.

On operating the handle 8, the shaft 60 is turned as previously described. The pitman cam 186 moves the pitman 183 upwards. The slotted lug 187 operates the pin 188 and the arm 189. By the aid of the shaft 190 the arms 191 and 192 and the rod 193 are also moved (Figs. 5 and 6).

By means of the slots 194 the rod 193 disengages the slotted lugs 16 of the connecting rods 15 from the pins 17 of the arms 18. Thereby the arms 19 and sleeves 40 are released for movement by the segments 23, free of the amount setting means 2 and 10.

The link 196 and the pitman 199 (Figs. 7 and 19) participate in the above explained movement of the lever 195. The slotted lug 203 engages the pin 204 of the arm 205. During the rotation of the shaft 60 the pitman cam 202 moves the pitman 199 upwards. The slotted lug 203 operates the pin 204 and the arm 205. By the aid of the shaft 132, the arm 136 and the levers 133 and 134 participate in this operation, and the spring operated pawl 137 engages the notch c of the arm 136. The fork shaped ends of the levers 133, 134 move the gears 227 of the shaft 135 into engagement with the toothed segments 23. At the same time the gear 262 of the shaft 135 meshes with the gear 261 (Fig. 10).

The movement of the lever 4 is transmitted to the type wheel 164 by means of the link 161, the arm 163, and the shaft 113 with the result that the printing symbol for "New balance credit" is put into printing position (Figs. 5 and 11).

The setting of the controlling mechanism for selecting the totalizer "New balance credit" is effected in the following way: The movement of the lever 4 is transferred to the arm 173, the hollow shaft 174 and to the lever 79a by the aid of the link 171 (Figs. 11, 3 and 13a). The arm 79a operates the corresponding controlling mechanism for selecting the "New balance totalizers" in the same way as previously described in the heading "First operation" regarding the selection of the controlling mechanism for the six totalizers of the first group. The arrangement of the parts is shown in Fig. 13a and the corresponding numbers of the parts in question are followed by the letter a.

As previously described, the gear 266 makes one clockwise revolution (Fig. 10). In the first half of this revolution the locking disks 264 and 263 prevent the gear 259 from turning. Thereupon the gear 259 makes a complete rotation during the second half of the revolution of gear 266. This mechanism has already been described in the foregoing description. The gear 262, the shaft 135 and the cams 234 (Fig. 19) participate in the turning movement of the gear 261. The studs 233 of the pawls 231 belonging to those disks 229 which are displaced by the above described operations come out of engagement with the arms 240 and the other arms of the pawls 231 move against the center of the shaft 135. By turning the latter the cams 234 engage the pawls 131. The pawls 131, the disks 129 and the gears 227 participate in this movement until the studs 233 engage the arms 240. At this moment all the gears 227 are in their normal position. The pawls 231 are disengaged from the cams 234 by their studs 233 (Figs. 19, 20, 21).

The segments 23 engaging the gears 227 participate in the movement of these gears as previously described (Fig. 9). By the aid of the hollow shafts 29, the arms 206a and the links 207a the segments 211a move the racks 213 (Fig. 14) in accordance with the turning movement of the gears 227.

As already described, the adding wheels of the totalizer "New balance credit" are in engagement with the racks 213 and consequently the movement of the racks 213 is transmitted to the adding wheels of the said totalizer.

The transfer mechanism for the totalizers "New balance credit" and "New balance capital" is the same as that outlined for the totalizers of the first group (see description in heading "First operation"). The setting of the amount type wheels 41 in accordance with the sum accumulated in the balance mechanism takes place in the following way: The movement of the segments 23 is transmitted to the arms 19, the hollow shafts 40 and to the amount type wheels 41 by the links 21 (Figs. 9 and 5). Owing to the aforesaid movement, the amount type wheels 41 are so adjusted that they show in printing position the sum accumulated in the balance mechanism.

By the aid of the shaft 135 and the cams 234 the turning movement of the gears 227 occurs in the subtractive direction. If for instance during the first and second operation one of the gears 227 is turned into a position corresponding to the number "7", this gear 227 is turned backwards by 7 divisions during the revolution of the shaft 135. Also the corresponding type wheel 41 is turned out of the zero position until the type "7" is in the printing position.

After the transmission of the sum accumulated in the balance mechanism to the totalizer for the "New balance credit" and to the amount type wheels 41 is effected, the pitman cam 202 moves the pitman 199 downwards. The slotted part 203 (Fig. 7) moves the pin 204, the arm 205, the shaft 132, the arm 136, the levers 133, 134 and the shaft 135. Owing to this movement the gears 227 are disengaged from the segments 23. Through the action of the spring 139 the pawl 137 engages the notch a of the arm 136 and holds the corresponding parts in their normal position.

During the movement of the shaft 135, the gear 262 is disengaged from the gear 261 (Fig. 10).

The backward movement of the mechanism actuated during this operation occurs shortly before the revolution of the main shaft 39 is finished. The cam 37 fastened to the main shaft 39 moves the parts 33, 30, 26, 25, 24, 21 and also the parts 19, 18, 40, 41 (Figs. 12 and 6) and likewise the parts 23, 29, 206a, 207a, 211a and 213 (Fig. 14). The exact description is given in heading "First operation".

After the arms 19 and 18 are moved into their zero position, the pitman cam 186 operates the pitman 183 downwards (Fig. 6). By means of the slotted lug 187, the pin 188, the arm 189, the shaft 190, the levers 191 and 192, the rod 193 and the connecting rods participate in this movement with the result that the slotted lugs 16 engage the pins 17 of the arms 18. During the backward movement of the lever 4 into its zero position, the cam race 176 of the plate 175 moves the lever 178, the shaft 120, the lever 179 and the lever 195 (Figs. 11, 6 and 7).

By the aid of the link 180 the lever 179 moves the pitman 183, and its slotted lug is disengaged from the pin 188 of the arm 189. At the same time the pin 279 moves the lever 278, and its slotted lug 278a engages the pin 188 of the arm 189 (Fig. 6).

Figure 7:
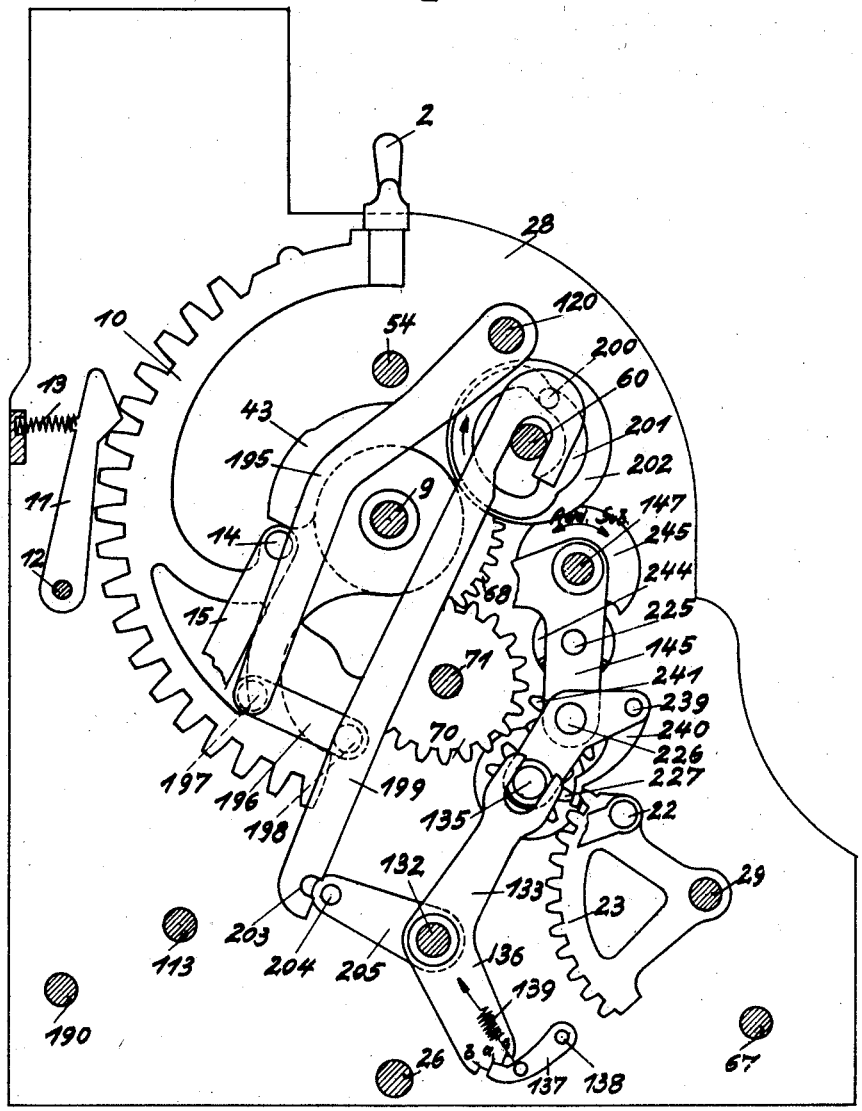
Fig. 7 is another side view of the amount setting mechanism on line 7—7 of Fig. 3.

By means of the link 196, the lever 195 moves the pitman 199 and disengages its slotted lug 203 from the pin 204 of the arm 205 (Fig. 7).

By the aid of the link 161, the arm 163, the shaft 113 and the type wheel 164 are moved into their normal position (Figs. 5 and 11).

After this operation of the machine, the actuating parts and the balance mechanism are all in their normal position.

What is claimed is:

1. In a machine of the class described, amount setting means, actuators controlled by said amount setting means, a balance mechanism controlled by said actuators comprising a rockable frame, counting wheels mounted in said frame, one for each order of said balance mechanism, a reversing pinion in constant engagement with each counting wheel, a second rockable frame for carrying said reversing pinions, means for directly rocking said counting wheels into engagement with said actuators during the forward movement of the latter for additive transmission of amounts into said balance mechanism and for disengaging said counting wheels from said actuators during their return movement, and means for rocking said second frame carrying said reversing pinions into engagement with said actuators during the forward movement of the latter for subtractive transmission of amounts into said balance mechanism.

2. In a machine of the class described, amount setting means, actuators controlled by said amount setting means, a balance mechanism controlled by said actuators comprising a rockable frame, counting wheels mounted in said frame, one for each order of said balance mechanism, a reversing pinion in constant engagement with each counting wheel, a second rockable frame for carrying said reversing pinions, means for directly rocking said counting wheels into engagement with said actuators during the forward movement of the latter for additive transmission of amounts into said balance mechanism and for disengaging said counting wheels from said actuators during their return movement, means for rocking said second frame carrying said reversing pinions into engagement with said actuators during the forward movement of the latter for subtractive transmission of amounts into said balance mechanism, and means for executing tens-transfer operations on said counting wheels during the return movement of said actuators in the disengaged positions of said counting wheels comprising a stationary shaft rotatable in said machine frame, a plurality of actuating disks mounted on said shaft for each order of said balance mechanism above the units order, a gear wheel on said shaft, two driving pinions on opposite sides of said gear wheel rotating in opposite directions during the latter portion of the machine operation, a rockable frame for carrying said pinions, each of said pinions alternately engaging said gear wheel to drive said actuating disks for executing tens transfer operations in accordance with the additive or subtractive entry of amounts into said balance mechanism.

3. In a machine of the class described, amount setting means, actuators controlled by said amount setting means, a balance mechanism controlled by said actuators comprising a rockable frame, counting wheels mounted in said frame, one for each order of said balance mechanism, a reversing pinion in constant engagement with each counting wheel, a second rockable frame for carrying said reversing pinions, means for directly rocking said counting wheels into engagement with said actuators during the forward movement of the latter for additive transmission of amounts into said balance mechanism and for disengaging said counting wheels from said actuators during their return movement, means for rocking said second frame carrying said reversing pinions into engagement with said actuators during the forward movement of the latter for subtractive transmission of amounts into said balance mechanism, and means for executing tens-transfer operations on said counting wheels during the return movement of said actuators in the disengaged positions of said counting wheels comprising a stationary shaft rotatable in said machine frame, a plurality of actuating disks mounted on said shaft for each order of said balance mechanism above the units order, wheels having transfer teeth intermediate said actuating disks and the reversing pinions, a cam connected to each reversing pinion for preparing said teeth for actuation by said disks in the course of operation of said counting wheels and reversing pinions, a gear wheel on said shaft, two driving pinions on opposite sides of said gear wheel rotating in opposite directions during the latter portion of the machine operation, a rockable frame for carrying said pinions, each of said pinions alternately engaging said gear wheel to drive said actuating disks for executing the prepared tens transfer operations in accordance with the additive or subtractive entry of amounts into said balance mechanism.

4. In a machine of the class described, amount setting means; actuators controlled by said amount setting means; a balance mechanism controlled by said actuators, said balance mechanism comprising a rocking frame, counting wheels mounted in said frame adjacent said actuators, reversing pinions respectively engaging said counting wheels, a second rocking frame carrying said reversing pinions, means for rocking said first frame to engage said counting wheels directly with said actuators, means for rocking said second frame to engage said reversing pinions with said actuators, a set of segments respectively opposed to said counting wheels on the side opposite said actuators, and means for rocking said first rocking frame to engage said counting wheels with said segments.

5. In a machine of the class described, amount setting means, actuators controlled thereby, a set of segments respectively opposite but spaced from said actuators, a balance mechanism comprising a set of counting wheels between said actuators and said segments, and a set of reversing pinions in constant engagement with said counting wheels, means alternatively to shift said counting wheels or said reversing pinions into engagement with said actuators, and means to shift said counting wheels into engagement with said segments.

6. In a machine of the class described, amount setting means, actuators controlled by said amount setting means, a group of totalizers respectively for accumulating credit and debit amounts, selecting means for said totalizers, a balance mechanism comprising a rockable frame, a set of counting wheels mounted in said frame, a set of reversing pinions respectively in constant engagement with said counting wheels, a second rockable frame on which said reversing pinions are mounted, means controlled by said selecting means upon selection of a credit totalizer for rocking said first frame to engage said counting wheels with said actuators, and means controlled by said selecting means upon selection of a debit totalizer for rocking said second frame to engage said reversing pinions with said actuators.

WILLY NAUMANN.